(12) United States Patent
Warner

(10) Patent No.: US 11,878,925 B2
(45) Date of Patent: Jan. 23, 2024

(54) METHODS AND SYSTEMS FOR TREATING WASTEWATER

(71) Applicant: Redhorse Constructors, Inc., San Rafael, CA (US)

(72) Inventor: David Warner, Fairfax, CA (US)

(73) Assignee: REDHORSE CONSTRUCTORS, INC., San Rafael, CA (US)

(*) Notice: Subject to any disclaimer, the term of this patent is extended or adjusted under 35 U.S.C. 154(b) by 0 days.

(21) Appl. No.: 16/808,705

(22) Filed: Mar. 4, 2020

(65) Prior Publication Data

US 2021/0024394 A1 Jan. 28, 2021

Related U.S. Application Data

(63) Continuation of application No. PCT/US2018/049511, filed on Sep. 5, 2018.
(Continued)

(51) Int. Cl.
*C02F 9/00* (2023.01)
*C02F 1/00* (2023.01)
(Continued)

(52) U.S. Cl.
CPC ............... *C02F 9/00* (2013.01); *C02F 1/004* (2013.01); *C02F 1/02* (2013.01); *C02F 1/06* (2013.01);
(Continued)

(58) Field of Classification Search
CPC ...... C02F 9/00; C02F 11/06; C02F 2001/007; C02F 2101/30; C02F 1/004; C02F 1/02; C02F 1/283; C02F 1/001; C02F 1/32; C02F 1/441; C02F 1/444; C02F 1/76; C02F 1/78; C02F 3/04; C02F 3/105; C02F 3/2806;
(Continued)

(56) References Cited

U.S. PATENT DOCUMENTS 3,766,867 A * 10/1973 DeAngelis .............. C02F 11/12
110/220
4,133,273 A 1/1979 Glennon
(Continued)

FOREIGN PATENT DOCUMENTS

CN 202924861 U 5/2013
DE 19702521 C1 * 3/1998 ................ C02F 3/08
(Continued)

OTHER PUBLICATIONS

PCT/US2018/049511 International Search Report and Written Opinion dated Dec. 26, 2018.
(Continued)

*Primary Examiner* — Claire A Norris
(74) *Attorney, Agent, or Firm* — Wilson Sonsini Goodrich & Rosati

(57) ABSTRACT

The present disclosure provides methods and systems for processing or treating wastewater. The methods of systems of the present disclosure may perform a treatment process on a wastewater stream including gray water and black water to produce a product stream. The product stream may comprise a potable water stream or a stream of treated water with a reduced concentration of one or more contaminant originally included in the wastewater stream.

19 Claims, 17 Drawing Sheets

Related U.S. Application Data

(60) Provisional application No. 62/554,217, filed on Sep. 5, 2017.

(51) Int. Cl.

| | |
|---|---|
| *C02F 1/28* | (2023.01) |
| *C02F 3/10* | (2023.01) |
| *C02F 3/28* | (2023.01) |
| *C02F 3/30* | (2023.01) |
| *C02F 1/02* | (2023.01) |
| *C02F 3/04* | (2023.01) |
| *C02F 1/06* | (2023.01) |
| *C02F 101/30* | (2006.01) |
| *C02F 103/00* | (2006.01) |

(52) U.S. Cl.
CPC .............. *C02F 1/283* (2013.01); *C02F 3/04* (2013.01); *C02F 3/105* (2013.01); *C02F 3/2806* (2013.01); *C02F 3/30* (2013.01); *C02F 2001/007* (2013.01); *C02F 2101/30* (2013.01); *C02F 2103/002* (2013.01); *C02F 2103/005* (2013.01); *C02F 2201/007* (2013.01); *C02F 2201/009* (2013.01); *C02F 2201/78* (2013.01); *C02F 2209/006* (2013.01); *C02F 2209/36* (2013.01); *C02F 2209/40* (2013.01); *C02F 2303/04* (2013.01); *C02F 2303/24* (2013.01)

(58) Field of Classification Search
CPC ...... C02F 3/30; C02F 3/101; C02F 2103/002; C02F 2103/005; C02F 2201/007; C02F 2201/009; C02F 2201/78; C02F 2209/006; C02F 2209/36; C02F 2209/40; C02F 2303/04; C02F 2303/24; Y02W 10/37; Y02W 10/10
USPC .... 210/605, 615, 748.1, 748.19, 748.2, 749, 210/754, 767
See application file for complete search history.

(56) References Cited

U.S. PATENT DOCUMENTS

| | | | | |
|---|---|---|---|---|
| 4,246,101 | A | * | 1/1981 | Selby, III .............. C02F 3/1242 210/615 |
| 4,359,789 | A | * | 11/1982 | Roberts .................. E03B 1/041 4/300 |
| 4,465,594 | A | * | 8/1984 | Laak ....................... C02F 3/306 210/903 |
| 4,812,237 | A | | 3/1989 | Cawley et al. |
| 5,494,576 | A | | 2/1996 | Hoppe et al. |
| 5,653,883 | A | * | 8/1997 | Newman ............... C02F 3/1284 210/908 |
| 6,106,716 | A | * | 8/2000 | Berkman .............. C02F 3/1242 210/603 |
| 6,379,546 | B1 | | 4/2002 | Braun |
| 7,648,638 | B2 | | 1/2010 | Essemiani et al. |
| 9,809,479 | B2 | * | 11/2017 | Prior ........................ C02F 9/00 |
| 2003/0111401 | A1 | | 6/2003 | Cocoli et al. |
| 2008/0110827 | A1 | | 5/2008 | Cote et al. |
| 2013/0068701 | A1 | * | 3/2013 | Bain .................... H04B 10/516 210/750 |

FOREIGN PATENT DOCUMENTS

| | | |
|---|---|---|
| WO | WO-2013162297 A1 | 10/2013 |
| WO | WO-2019050920 A1 | 3/2019 |

OTHER PUBLICATIONS

Waymouth, B. Eco-Minded Kids + Water Filtration in African Slum = Ingenious Reincarnation of Plastic Bottles. HUFFPOST. Published Mar. 19, 2015; Updated Dec. 6, 2017. Available at https://www.huffpost.com/entry/ecominded-kids-water-filtration-in-african-slum_b_6899280. Accessed on Jun. 4, 2020.

Waymouth, B. Poop + Plastic = Good News for H2O Parched California. HUFFPOST. Published Apr. 24, 2015; Updated Dec. 6, 2017. Available at https://www.huffpost.com/entry/good-news-for-h2o-parched-california_b_7112814.Accessed on Jun. 4, 2020.

\* cited by examiner

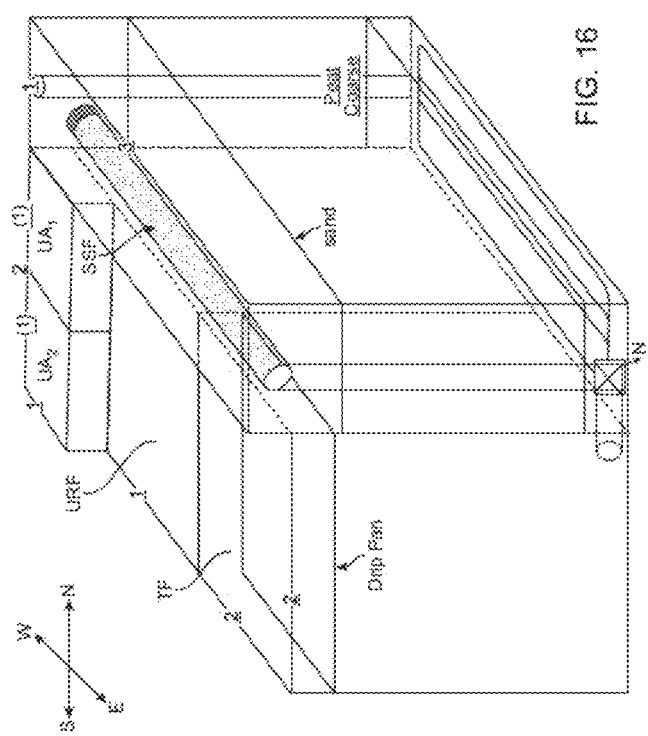

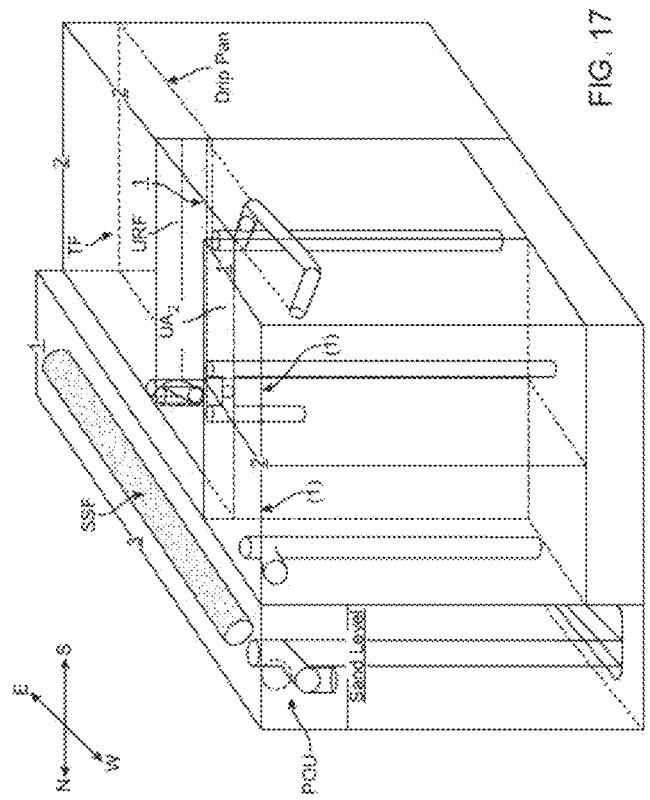

METHODS AND SYSTEMS FOR TREATING WASTEWATER

CROSS-REFERENCE

This application is a continuation of International Patent Application No. PCT/US2018/049511, filed Sep. 5, 2018, which claims the benefit of U.S. Provisional Patent Application No. 62/554,217, filed Sep. 5, 2017, each of which is entirely incorporated herein by reference for all purposes.

BACKGROUND

Wastewater is used water. It may include substances such as human waste, food scraps, oils, soaps and chemicals, including chemicals from pharmaceuticals. Household wastewater may include water from sinks, showers, bathtubs, toilets, washing machines and dishwashers. Businesses and industries may also contribute their share of used water. Wastewater may be full of contaminants including bacteria, viruses, chemicals and other toxins. Proper wastewater treatment processes may reduce the contaminants to acceptable levels to make the water safe for discharge back into the environment or for use in a household.

SUMMARY

At least some existing systems and methods for treating wastewater may have various issues such as noise issues, being designed for outdoors, or requiring additional underground vaults. While there may be some methods for treating wastewater to standards sufficient for environmental discharge, such methods may be resource intensive and ultimately expensive. Recognized herein is a need for methods and systems for producing potable water from wastewater. The systems and methods disclosed herein may require minimum maintenance. The systems of the present disclosure may readily be integrated with or retrofitted into any plumbing system without additional space or underground vaults.

An aspect of the present disclosure provides a method for processing wastewater comprising: (a) collecting wastewater comprising black water to produce a wastewater stream; and (b) subjecting the wastewater stream to one or more of (i) a separation process to separate a solid phase from a liquid phase of the wastewater stream, (ii) an anaerobic digestion process to reduce a concentration of anaerobic species from the wastewater stream, (iii) an aerobic digestion process to reduce a concentration of aerobic species from the wastewater stream, and (iv) a disinfection process to reduce a concentration of bacteria and/or viruses from the wastewater stream, thereby producing a product stream having drinking-water quality.

In some embodiments, the product stream has a microbes concentration that is less than 1 parts per million. In some embodiments, the method further comprises using a sensor to detect a property of the product stream. In some embodiments, the sensor is an inline sensor. In some embodiments, the property includes a concentration of one or more microbes in the product stream. In some embodiments, the method further comprises adjusting a fluid property of the wastewater stream in response to the property of the product stream detected using the sensor. In some embodiments, the method further comprises, prior to (b), subjecting the wastewater steam to an additional separation process. In some embodiments, the method further comprises, collecting solid components separated from the wastewater steam in the additional separation process. In some embodiments, the method further comprises, subjecting the solid components to an incineration process. In some embodiments, the method further comprises, reducing a volume of the solid components using a grinder. In some embodiments, the method further comprises, prior to (b), passing the wastewater stream through a plastic material to produce an effluent stream having a reduced concentration of organic components than the wastewater stream. In some embodiments, the plastic material is a non-porous material. In some embodiments, the plastic material comprises a layer of biofilm. In some embodiments, the biofilm is formed on a surface of the plastic material. In some embodiments, the biofilm has a thickness between about 25 micron ($\mu m$) and 250 $\mu m$. In some embodiments, the separation process comprises filtration. In some embodiments, the filtration comprises membrane filtration. In some embodiments, the membrane filtration comprises one or more of reverse osmosis, nanofiltration, ultrafiltration and microfiltration. In some embodiments, the separation process comprises sand filtration. In some embodiments, the sand filtration comprises rapid sand filtration. In some embodiments, the sand filtration comprises slow sand filtration. In some embodiments, the separation process comprises roughing filtration. In some embodiments, the roughing filtration comprises downflow, upflow and/or horizontal flow roughing filtration. In some embodiments, the roughing filtration comprises one or more filter media. In some embodiments, the one or more filter media comprise sand, gravel and/or fiber. In some embodiments, filtration rate is greater than or equal to about 0.5 m/h. In some embodiments, the separation process comprises sedimentation, flotation and/or precipitation. In some embodiments, the disinfection process comprises ozonation, chemical disinfection, solar disinfection and/or chlorine dosing. In some embodiments, the chemical disinfection comprises chlorination. In some embodiments, the solar disinfection comprises ultraviolet radiation. In some embodiments, the wastewater stream is subjected to two or more of (i)-(iv). In some embodiments, the wastewater stream is subjected to three or more of (i)-(iv). In some embodiments, the wastewater stream is subjected to (i)-(iv). In some embodiments, the method further comprises subjecting the wastewater stream to a purification process to decrease a concentration of one or more contaminants in the wastewater stream. In some embodiments, the purification process comprises charcoal filtration. In some embodiments, the method further comprises subjecting the wastewater stream to a sterilization process to decrease a concentration of one or more contaminants in the wastewater stream. In some embodiments, the sterilization process comprises flash sterilization and/or steam sterilization.

Another aspect of the present disclosure provides a system for processing wastewater comprising: a container configured to receive wastewater comprising black water and to produce a wastewater stream; and one or more processing units in fluidic communication with the container, the one or more processing units configured to receive the wastewater stream from the container and to perform one or more of (i) a separation process to separate a solid phase from a liquid phase of the wastewater stream, (ii) an anaerobic digestion process to reduce a concentration of anaerobic species from the wastewater stream, (iii) an aerobic digestion process to reduce a concentration of aerobic species from the wastewater stream, and (iv) a disinfection process to reduce a concentration of bacteria and/or viruses from the wastewater stream, thereby producing a product stream having drinking-water quality.

In some embodiments, the product stream has a microbes concentration that is less than 1 parts per million. In some embodiments, the system further comprises a sensor that detects a property of the product stream. In some embodiments, the sensor is an inline sensor. In some embodiments, the property includes a concentration of one or more microbes in the product stream. In some embodiments, a fluid property of the wastewater stream is adjusted in response to the property of the product stream detected using the sensor. In some embodiments, the system further comprises an additional processing unit downstream of and in fluidic communication with the container. In some embodiments, the additional processing unit is configured to receive the wastewater stream from the container and perform an additional separation process on the wastewater stream prior to directing the wastewater stream into the one or more processing units. In some embodiments, the system further comprises a waste tank configured to receive solid components separated from the wastewater stream in the additional separation process. In some embodiments, the system further comprises an incineration unit configured to receive the solid components from the waste tank and to perform an incineration process on the solid components. In some embodiments, the system further comprises a grinder configured to receive the solid components from the waste tank and to reduce a volume of the solid components. In some embodiments, the additional processing unit comprises a plastic material. In some embodiments, the additional process unit permits the wastewater stream to pass through the plastic material to produce an effluent stream having a reduced concentration of organic components than the wastewater stream. In some embodiments, the plastic material is a non-porous material. In some embodiments, the plastic material comprises a layer of biofilm. In some embodiments, the layer of biofilm is formed on a surface of the plastic material. In some embodiments, the biofilm has a thickness less than about 250 micron ($\mu$m). In some embodiments, the biofilm has a thickness greater than about 25 $\mu$m. In some embodiments, the separation process comprises filtration. In some embodiments, the filtration comprises membrane filtration. In some embodiments, the membrane filtration comprises one or more of reverse osmosis, nanofiltration, ultrafiltration and microfiltration. In some embodiments, the separation process comprises sand filtration. In some embodiments, the sand filtration comprises rapid sand filtration. In some embodiments, the sand filtration comprises slow sand filtration. In some embodiments, the separation process comprises roughing filtration. In some embodiments, the roughing filtration comprises downflow, upflow and/or horizontal flow roughing filtration. In some embodiments, the roughing filtration comprises one or more filter media. In some embodiments, the one or more filter media comprise sand, gravel and/or fiber. In some embodiments, filtration rate is greater than or equal to about 0.5 m/h. In some embodiments, the separation process comprises sedimentation, flotation and/or precipitation. In some embodiments, the disinfection process comprises ozonation, chemical disinfection, and/or solar disinfection. In some embodiments, the chemical disinfection comprises chlorination. In some embodiments, the solar disinfection comprises ultraviolet radiation. In some embodiments, the one or more processing units each comprise one or more subunits. In some embodiments, each of the one or more subunits is configured to perform a process selected from (i)-(iv). In some embodiments, a given subunit configured to perform the anaerobic digestion process comprises iron filings. In some embodiments, a given subunit configured to perform the anaerobic digestion process comprises a plastic material. In some embodiments, the container is integrated with the one or more processing units. In some embodiments, the system is retrofitted into an existing plumbing system. In some embodiments, the system is integrated with a plumbing system. In some embodiments, the system further comprises a computer processor operatively coupled to the container and/or the one or more processing units. In some embodiments, the system further comprises a computer control unit. In some embodiments, the computer control unit is programmed to control fluid flow rate of the wastewater stream in the container, and/or from the container to the one or more processing units. In some embodiments, the computer control unit is programmed to direct fluid flow among the container and the one or more processing units. In some embodiments, the computer control unit is programmed to monitor operations of the container and/or the one or more processing units. In some embodiments, the one or more processing units comprise no more than four processing units. In some embodiments, the one or more processing units comprise no more than three processing units. In some embodiments, the one or more processing units are connected to one another in series. In some embodiments, the one or more processing units are further configured to perform a purification process on the product stream to decrease a concentration of one or more contaminants in the product stream. In some embodiments, the purification process comprises charcoal filtration. In some embodiments, the system further comprises a sterilization unit configured to perform a sterilization process on the product stream to decrease a concentration of one or more contaminants in the product stream. In some embodiments, the sterilization process comprises flash sterilization and/or steam sterilization. In some embodiments, the system further comprises an energy supply unit configured to provide thermal energy for the sterilization process. In some embodiments, the energy supply unit comprises a panel collector and a plurality of optical mirrors or lenses. In some embodiments, the panel collector and the plurality of optical mirrors or lenses are configured to concentrate solar thermal energy. In some embodiments, at least a portion of the solar thermal energy is converted to electrical energy. In some embodiments, the electrical energy is used for operating the system. In some embodiments, the container and the one or more processing units are made of plastic materials. In some embodiments, the system has a footprint less than about 1 m$^2$. In some embodiments, the system has a weight less than about 1 kg. In some embodiments, the one or more processing units are configured to perform two or more of (i)-(iv) on the wastewater stream. In some embodiments, the one or more processing units are configured to perform three or more of (i)-(iv) on the wastewater stream. In some embodiments, the one or more processing units are configured to perform (i)-(iv) on the wastewater stream.

Another aspect of the present disclosure provides a method for processing wastewater comprising: directing a wastewater stream to one or more processing units configured to perform on the wastewater stream one or more of (i) a separation process to separate a solid phase from a liquid phase of the wastewater stream, (ii) an anaerobic digestion process to reduce a concentration of anaerobic species from the wastewater stream, (iii) an aerobic digestion process to reduce a concentration of aerobic species from the wastewater stream, and (iv) a disinfection process to reduce a concentration of bacteria and/or viruses from the wastewater stream, thereby producing a product stream having drinking-water quality, wherein a ratio of a volume of the product stream to a volume of the wastewater stream is at least about 0.9.

In some embodiments, the method further comprises collecting wastewater to produce the wastewater stream. In some embodiments, the wastewater comprises gray water, black water or a combination thereof. In some embodiments, the ratio is at least about 0.95. In some embodiments, the one or more processing units are operated substantially passively. In some embodiments, the method further comprises using a sensor to detect a property of the product stream. In some embodiments, the sensor is an inline sensor. In some embodiments, the method further comprises repeating at least one of the separation process, the anaerobic digestion process, the aerobic digestion process and the disinfection process in response to the property detected using the sensor. In some embodiments, the at least one of the separation process, the anaerobic digestion process, the aerobic digestion process and the disinfection process are repeated until the property of the product stream reaches a pre-determined value. In some embodiments, the wastewater stream is subjected to two or more of (i)-(iv). In some embodiments, the wastewater is subjected to three or more of (i)-(iv). In some embodiments, the wastewater is subjected to all of (i)-(iv). In some embodiments, the method further comprises subjecting the product stream to a purification process to purify the product stream.

Another aspect of the present disclosure provides a system for processing wastewater comprising: one or more processing units configured to receive a wastewater stream and perform on the wastewater stream one or more of (i) a separation process to separate a solid phase from a liquid phase of the wastewater stream, (ii) an anaerobic digestion process to reduce a concentration of anaerobic species from the wastewater stream, (iii) an aerobic digestion process to reduce a concentration of aerobic species from the wastewater stream, and (iv) a disinfection process to reduce a concentration of bacteria and/or viruses from the wastewater stream, thereby producing a product stream having drinking-water quality, wherein a ratio of a volume of the product stream to a volume of the wastewater stream is at least about 0.9.

In some embodiments, the system further comprises a holding tank in communication with the one or more processing units and configured to collect wastewater to produce the wastewater stream. In some embodiments, the wastewater comprises gray water, black water or a combination thereof. In some embodiments, the ratio is at least about 0.95. In some embodiments, at least some of the or more processing units comprise a mesh bag comprising a non-porous material. In some embodiments, the non-porous material comprises plastic material. In some embodiments, the plastic material comprises polymeric material. In some embodiments, the mesh bag comprises a plurality of pores having an average pore size between about 1 millimeter (mm) and 10 mm. In some embodiments, the non-porous material comprises a layer of biofilm. In some embodiments, the layer of biofilm has a thickness less than about 250 micron ($\mu$m). In some embodiments, the one or more processing units comprise sand filters. In some embodiments, the sand filters comprise rapid sand filters, slow sand filters or a combination thereof. In some embodiments, the sand filters are substantially passively operated. In some embodiments, the sand filters are operated in the absence of external energy. In some embodiments, the external energy comprises mechanical energy, electrical energy or a combination thereof. In some embodiments, the system further comprises one or more pumps configured to regulate fluid flow of the wastewater stream and/or the product stream. In some embodiments, the one or more pumps comprise a dosing pump, a timed pump, a transfer pump or a combination thereof. In some embodiments, the system further comprises one or more sensors configured to detect a property of the wastewater stream and/or the product stream. In some embodiments, the fluid flow of the wastewater and/or the product stream is adjusted in response to the property detected by the one or more sensors. In some embodiments, the fluid flow of the wastewater and/or the product stream is adjusted in real time. In some embodiments, the one or more processing units are modular units associated with one another. In some embodiments, one or more processing units are enclosed in a single container. In some embodiments, the system is retrofitted into an existing plumbing system. In some embodiments, the system is integrated with an existing plumbing system. In some embodiments, the system is portable. In some embodiments, the one or more processing units are made from plastic materials. In some embodiments, the system has a footprint less than about 1 m². In some embodiments, the system has a weight less than 1 kilogram (kg). In some embodiments, the one or more processing units are configured to perform two or more of (i)-(iv) on the wastewater stream. In some embodiments, the one or more processing units are configured to perform three or more of (i)-(iv) on the wastewater stream. In some embodiments, the one or more processing units are configured to perform (i)-(iv) on the wastewater stream.

Another aspect of the present disclosure provides a method for processing wastewater comprising: directing a wastewater stream to a treatment unit configured to perform a treatment process on the wastewater to produce an effluent stream having a reduced concentration of solids than the wastewater stream; and directing the effluent stream through one or more processing unit configured to perform on the effluent stream one or more of (i) a separation process to separate a solid phase from a liquid phase of the wastewater stream, (ii) an anaerobic digestion process to reduce a concentration of anaerobic species from the wastewater stream, (iii) an aerobic digestion process to reduce a concentration of aerobic species from the wastewater stream, and (iv) a disinfection process to reduce a concentration of bacteria and/or viruses from the wastewater stream, thereby producing a product stream having drinking-water quality, wherein an average residence time for processing 100 liters (L) of the effluent stream is less than about 30 minutes (min).

In some embodiments, the effluent stream has a volume between about 250 L and 1,000 L. In some embodiments, the average residence time is less than about 15 min. In some embodiments, the treatment process comprises a settling process, a sedimentation process, an anaerobic process or a combination thereof. In some embodiments, the product stream has a microbes concentration less than 1 parts per million. In some embodiments, the wastewater stream comprises gray water, black water or a combination thereof. In some embodiments, the method further comprises passing the wastewater stream through a mesh bag comprising non-porous material to reduce a concentration of microbes from the wastewater stream. In some embodiments, the treatment process and the passing the wastewater stream through the mesh bag are performed simultaneously or sequentially. In some embodiments, the mesh bag comprises a plurality of pores having an average pore size between about 1 milliliter (mm) and 10 mm. In some embodiments, the non-porous material comprises plastic materials. In some embodiments, the method further comprises detecting a property of the product stream using one or more sensors. In some embodiments, the one or more sensors are inline sensors. In some embodiments, the method further comprises adjusting a fluid property of the wastewater stream and/or the effluent stream in response to the property of product stream detected using the one or more sensors. In some embodiments, the fluid property of the wastewater stream and/or the effluent stream is adjusted in real time. In some embodiments, the method further comprises recycling at least a portion of the product stream when the property of the product stream is lower than a pre-determined value. In some embodiments, the method further comprises recycling at least a portion of the product stream when the property of the product stream is higher than a pre-determined value. In some embodiments, the method further comprises repeating at least one of the separation process, the anaerobic digestion process, the aerobic digestion process and the disinfection process in response to the property of the product stream detected using the one or more sensors. In some embodiments, the method further comprises repeating at least one of the separation process, the anaerobic digestion process, the aerobic digestion process and the disinfection process until the property of the product stream reaches a pre-determined value. In some embodiments, the method further comprises regulating fluid flow of the wastewater stream, the effluent stream and/or the product stream using pumps and valves. In some embodiments, the pumps comprise dosing pumps, timed pumps, transfer pumps or a combination thereof. In some embodiments, the one or more processing units are configured to perform two or more of (i)-(iv) on the effluent stream. In some embodiments, the one or more processing units are configured to perform three or more of (i)-(iv) on the effluent stream. In some embodiments, the one or more processing units are configured to perform (i)-(iv) on the effluent stream.

Another aspect of the present disclosure provides a system for processing wastewater comprising: a treatment unit configured to receive a wastewater stream and perform a treatment process on the wastewater stream to produce an effluent stream having a reduced concentration of solids than the wastewater stream; and one or more processing units in fluidic communication with the treatment unit and configured to receive the effluent stream and perform on the effluent stream one or more of (i) a separation process to separate a solid phase from a liquid phase of the wastewater stream, (ii) an anaerobic digestion process to reduce a concentration of anaerobic species from the wastewater stream, (iii) an aerobic digestion process to reduce a concentration of aerobic species from the wastewater stream, and (iv) a disinfection process to reduce a concentration of bacteria and/or viruses from the wastewater stream, thereby producing a product stream having drinking-water quality, wherein an average residence time for processing 100 liters (L) of the effluent stream is less than about 30 minutes (min).

In some embodiments, the effluent stream has a volume between about 250 L and 1,000 L. In some embodiments, the treatment process comprises a settling process, a sedimentation process, an anaerobic process or a combination thereof. In some embodiments, the treatment unit is a septic tank. In some embodiments, the system further comprises a holding tank in fluidic communication with the treatment unit and configured to receive wastewater from various sources and retain the wastewater for a pre-determined period of time. In some embodiments, the holding tank is further configured to produce the wastewater stream. In some embodiments, the holding tank is configured to retain a fluid volume that is greater than about 250 L. In some embodiments, the holding tank is part of the treatment unit. In some embodiments, the holding tank is upstream of the treatment unit. In some embodiments, the holding tank is configured to regulate a flow rate of the wastewater stream that is directed into the treatment unit. In some embodiments, the one or more processing units comprise one or more of a sedimentation tank, an anaerobic filter, an aerobic filter, a roughing filter, a sand filter, a charcoal chamber, and an ozonation chamber. In some embodiments, the system is operated substantially passively. In some embodiments, the treatment unit and the one or more processing units are modular units. In some embodiments, the treatment unit and the one or more processing units are enclosed in a single container. In some embodiments, the system is portable. In some embodiments, the system has a footprint less than about 1 $m^2$. In some embodiments, the system has a weight less than about 1 kilogram (kg). In some embodiments, the one or more processing units are configured to perform two or more of (i)-(iv) on the effluent stream. In some embodiments, the one or more processing units are configured to perform three or more of (i)-(iv) on the effluent stream. In some embodiments, the one or more processing units are configured to perform (i)-(iv) on the effluent stream.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 16 is a schematic side view of the sample system of FIG. 15; and

FIG. 17 is another schematic side view of the sample system of FIG. 15.

DETAILED DESCRIPTION

Figure 1:
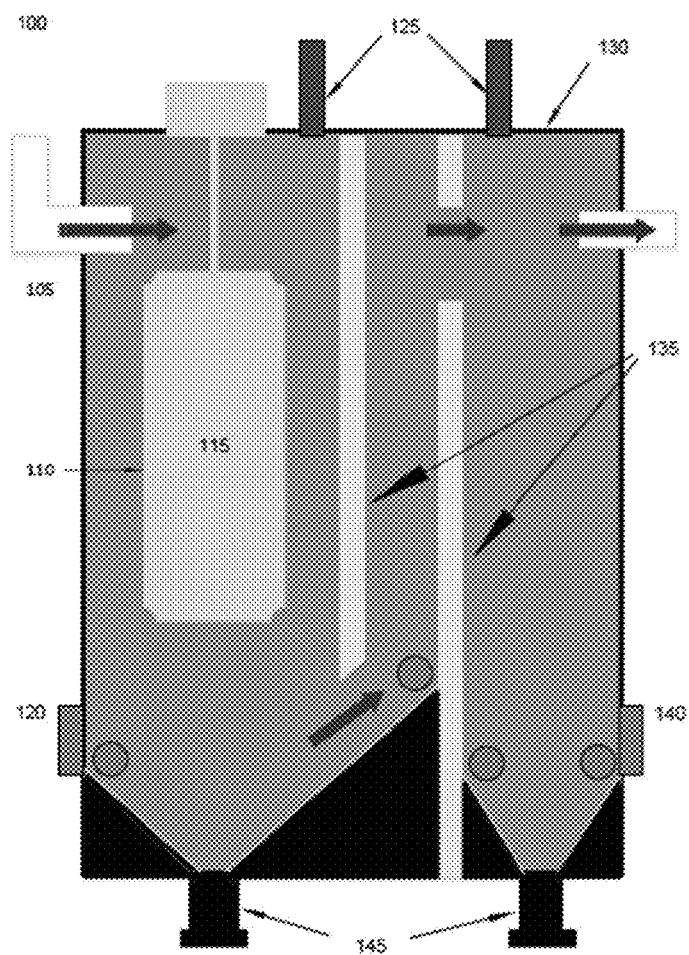
FIG. 1 provides a cross-sectional schematic of an example wastewater treatment tank comprising a mesh bag containing a non-porous material.

The present disclosure is not limited to specific compositions, method steps, or equipment. It is also to be understood that the terminology used herein is for the purpose of describing particular embodiments only, and is not intended to be limiting. Methods recited herein may be carried out in any order of the recited events that is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Whenever the term "at least," "greater than," or "greater than or equal to" precedes the first numerical value in a series of two or more numerical values, the term "at least" or "greater than" applies to each one of the numerical values in that series of numerical values.

Whenever the term "no more than," "less than," or "less than or equal to" precedes the first numerical value in a series of two or more numerical values, the term "no more than" or "less than" applies to each one of the numerical values in that series of numerical values.

As used herein, the term "graywater" generally refers to wastewater generated in households or office buildings from fluid streams not having detectable amounts of fecal matter and/or urine. Sources of graywater may include sinks, showers, baths, washing machines or dish washers.

As used herein, the term "blackwater" generally refers to wastewater containing detectable amounts of fecal matter and/or urine. Blackwater may be flushwater from toilets or other sources that may include feces and/or urine (e.g., cleansing), such as bath tissue.

Methods

An aspect of the present disclosure provides methods for treating wastewater comprising collecting wastewater to produce a wastewater stream. The wastewater may comprise gray water, black water or combinations thereof. The wastewater stream may then be subjected to one or more processing steps to produce a product stream. The product stream may have drinking-water quality (i.e., the product stream may be a treatment stream that may be potable). A product stream having drinking-water quality may be a water stream that has certain contaminants with an amount or concentration within all regulatory limits set forth by United States Environmental Protection Agency (US EPA). For example, the product stream may be a water stream that meets contaminant standards are required by the Safe Drinking Water Act (SDWA) and/or National Primary Drinking Water Regulations (NPDWRs). The product stream may be a water stream that is at or below all US EPA Maximum contaminant levels (MCLs) and/or has required levels for various criteria as deemed both preferable and safe for human health. In some examples, the product stream may comprise little or no total coliforms/*Escherichia coli* (*E. coli*). In some cases, there is 0 parts per million (ppm) *E. coli* or total coliforms present in the product stream. In some cases, the product stream has a pH value between about 6 and 8.5.

The product stream may have a microbes concentration that is less than or equal to about 100 parts per million (ppm), 90 ppm, 80 ppm, 70 ppm, 60 ppm, 50 ppm, 40 ppm, 30 ppm, 20 ppm, 10 ppm, 9 ppm, 8 ppm, 7 ppm, 6 ppm, 5 ppm, 4 ppm, 3 ppm, 2 ppm, 1 ppm, 0.9 ppm, 0.8 ppm, 0.7 ppm, 0.6 ppm, 0.5 ppm, 0.4 ppm, 0.3 ppm, 0.2 ppm, 0.1 ppm, 0.08 ppm, 0.06 ppm, 0.04 ppm, 0.02 ppm, 0.01 ppm, or less.

The one or more processing steps may comprise any processing steps as described above and elsewhere herein. The one or more processing steps may comprise separation processes, anaerobic processes, aerobic processes, disinfection processes, purification processes, sterilization processes, or combinations thereof. Depending upon, quality of the wastewater supply, end use of the product stream, some or all of the processing steps may be repeated at least 1, 2, 3, 4, 5, 6, 7, 8, 9, 10 times or more.

The separation processes may separate a solid phase from a liquid phase of the wastewater stream. The separation processes may comprise chemical, physical and/or biological reactions or processes. The separation process may comprise filtration. The filtration may comprise membrane filtration. The membrane filtration may comprise one or more of reverse osmosis, nanofiltration, ultrafiltration and microfiltration. Materials for membrane filtration may have an average pore size greater than about 0.001 µm, 0.005 µm, 0.01 µm, 0.05 µm, 0.1 µm, 0.2 µm, 0.3 µm, 0.4 µm, 0.5 µm, 0.6 µm, 0.7 µm, 0.8 µm, 0.9 µm, 1 µm, 2 µm, 4 µm, 6 µm, 8 µm, 10 µm, 15 µm, 20 µm or more. In some cases, the average pore size of the membrane filtration materials is less than or equal to about 200 µm, 150 µm, 100 µm, 80 µm, 60 µm, 40 µm, 20 µm, 18 µm, 16 µm, 14 µm, 12 µm, 10 µm, 9 µm, 7 µm, 5 µm, 3 µm, 1 µm, or less. In some cases, the average pore size of the membrane filtration materials is between any of the two values described above.

The separation process may comprise sand filtration. The sand filtration may comprise rapid sand filtration, slow sand filtration, or a combination thereof. The sand filtration process may be configured to remove bacteria, viruses and/or organic matters from the wastewater stream.

The separation process may comprise roughing filtration. The roughing filtration may comprise downflow, upflow and/or horizontal flow roughing filtration. The filtration may comprise one or more filter media. Examples of the filter media may include, but not limited to, sand, gravel, and/or fiber. Filtration rate in the roughing filtration may vary. In some cases, the rate is greater than or equal to about 0.1 meter/hour (m/h), 0.2 m/h, 0.3 m/h, 0.4 m/h, 0.5 m/h, 0.6 m/h, 0.7 m/h, 0.8 m/h, 0.9 m/h, 1 m/h, 1.2 m/h, 1.4 m/h, 1.6 m/h, 1.8 m/h, 2 m/h or more. In some cases, the rate is less than or equal to about 3 m/h, 2.5 m/h, 2 m/h, 1.5 m/h, 1 m/h, 0.8 m/h, 0.6 m/h, 0.4 m/h, 0.2 m/h, 0.1 m/h or less. In some cases, the rate is between any of the two values described above, for example, between about 0.3 m/h and about 0.6 m/h. In some cases, the separation process comprises sedimentation, flotation, precipitation or combinations thereof.

The anaerobic processes may digest anaerobic species from the wastewater stream. The anaerobic processes may reduce a concentration of one or more anaerobic species from the wastewater stream. The anaerobic processes may be an anaerobic digestion process. The anaerobic digestion process may digest or break down contaminants such as organic matters in the wastewater or effluent stream.

The aerobic processes may digest aerobic species from the wastewater stream. The aerobic processes may reduce a concentration of one or more aerobic species from the wastewater stream. The aerobic process may be an aerobic digestion process. The aerobic digestion process may digest or consume contaminants such as organic matters in the wastewater or effluent stream. The aerobic digestion process may consume organic matter and convert it into carbon dioxide, water and a range of lower molecular weight organic compounds.

The disinfection processes may reduce a concentration of one or more unwanted species/components (e.g., bacteria, viruses, pathogens, pollutants, contaminants, other microorganisms, gases or odors) from the wastewater stream. The disinfection process may comprise ozonation, chemical disinfection, solar disinfection or combinations thereof. The chemical disinfection may comprise chlorination. The solar disinfection may comprise ultraviolet radiation. In some cases, the ozonation is immediately followed by a UV-radiation disinfection process.

The one or more processing steps may comprise a purification process. The purification process may reduce a concentration of one or more contaminants or harmful substances comprised in the wastewater stream. The purification process may improve the taste, odor, and/or taste of the water. The purification process may comprise charcoal filtration.

The one or more processing steps may comprise a sterilization process. The sterilization process may reduce a concentration of one or more contaminants or harmful substances comprised in the wastewater stream. The sterilization process may comprise flash sterilization and/or steam sterilization.

As described above and elsewhere herein, the wastewater stream may be subjected to at least one, two, three, four, or more of the various processing steps. In some cases, depending upon the condition of the wastewater stream, one or more processing steps may be repeated at least 1, 2, 3, 4, 5, 6, 7, 8, 9, 10 times or more. For example, in cases where a wastewater stream have a high concentration of solid wastes, the separation processes may be repeated several times until a concertation of the solid wastes is reduced to a predetermined level. In another example, in cases where a wastewater stream has a high concentration of aerobic species, aerobic processes may be repeated at least 1, 2, 3, 4, 5 times or more so as to decrease a concentration of the aerobic species to a predetermined level. The one or more processing steps may be performed simultaneously, sequentially or alternately. In some cases, an effluent stream produced after the first cycle (which includes all of the processing steps) may be subject to a second cycle for further processing. In some cases, the same stream of wastewater may be subject to several cycles of processing to produce a product stream that meets a pre-determined standard (e.g., drinking-water standard).

In some cases, methods of the present disclosure may further comprise using a sensor to detect a property of the product stream. The sensor may be an inline sensor. The sensor may be an online sensor. The sensor may be configured to detect a property of the product stream. The property may comprise temperature, pressure, flow rate, turbidity, total suspended solids (TSS), color, microbial or chemical presence, or any other measurable properties of the product stream. The property may also comprise concentrations of one or more contents such as contaminants in the product stream. In response to the property detected using the sensor, a fluid property of the wastewater stream and/or the effluent stream may be adjusted. In some cases, the mesh bag and/or the non-porous materials in the mesh bag are replaced, in response to the property detected using the sensor.

The wastewater stream may comprise both gray water and black water collected from various sources. In some cases, the wastewater stream is directly subjected to the one or more processing steps without separating the gray water and the black water. In some cases, the methods comprise separating the gray water from black water to produce two separate streams, a gray water stream and a black water stream. The gray water stream and the black water stream may be subjected to the same or a different treatment process.

In some cases, the methods comprise an additional separation process prior to subjecting the wastewater stream to the one or more processing steps. The additional separation process may separate at least a portion of (for example, at least about 5%, 10%, 15%, 20%, 25%, 30%, 35%, 40%, 45%, 50 wt % or more) solid components (or solids) initially included in the wastewater stream from the wastewater stream. The solid components separated in the additional separation process may be collected. At least a portion of the collected solid components may be subjected to an incineration process. In some cases, at least a portion of the collected solid components may be directed into a grinder to cut the solid components into smaller pieces.

In some cases, the methods comprise, prior to the one or more processing steps, passing at least a portion of the wastewater stream through a porous material such as a mesh bag. The porous material may comprise a plurality of pores. The plurality of pores may have an average pore size (e.g., diameter or cross-section) that is greater than or equal to about 50 micron (µm), 100 µm, 150 µm, 200 µm, 300 µm, 400 µm, 500 µm, 600 µm, 700 µm, 800 µm, 900 µm, 1 millimeter (mm), 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 11 mm, 12 mm, 13 mm, 14 mm, 15 mm, or more. In some cases, the average pore size is less than or equal to about 20 mm, 18 mm, 16 mm, 14 mm, 12 mm, 10 mm, 8 mm, 6 mm, 4 mm, 2 mm, 1 mm, or less. In some cases, the average pore size is between any of the two values described above, for example, between about 1 mm and about 10 mm.

The mesh bag may contain a non-porous material. The non-porous material may be solid, semi-solid or combinations thereof. The non-porous material may comprise plastic materials. The plastic materials may comprise one or more types of plastic materials, for example, type 1-, type 2-, type 3-, type 4-, type 5-, type 6-, type 7-plastics or any other types of plastics or combinations thereof. The plastic materials can be synthetic materials, semi-synthetic materials, or combinations thereof. Non-limiting examples of the plastic materials may include polyethylene such as high-density polyethylene (HDPE) or low-density polyethylene (LDPE), polyethylene terephtalate (PET), polyester, polyamides (PA), polycarbonate (PC), polypropylene (PP), polystyrene (PS), polyurethanes (PU), polyvinyl chloride (PVC), polyvinylidene chloride (PVDC), acrylonitrile butadiene styrene (ABS) such as polycarbonate/acrylonitrile butadiene styrene (PC/ABS) and polyethylene/acrylonitrile butadiene styrene (PE/ABS), polyepoxide (epoxy), polymethyl methacrylate (PMMA), polytetrafluoroethylene (PTFE), phenolics or phenol formaldehyde (PF), melamine formaldehyde (MF), urea-formaldehyde (UF), polyetheretherketone (PEEK), maleimide/bismaleimide, polyetherimide (PEI), polyimide, plastarch material, polylactic acid (PLA), furan, silicone, polysulfone, or combinations thereof.

In some examples, the plastic materials are from fluid bottles, such as, for example, beverage, detergent, milk, or water bottles. The bottles may be used or unused. The used bottles may be obtained from a landfill. The bottles may be cut into pieces (for example cut in half). Such process may be performed manually or mechanically. The bottles or pieces thereof may be twisted and crumpled. The twisted or crumpled bottles or pieces may further be cut into smaller pieces such as pieces having a length less than or equal to about 20 centimeters (cm), 18 cm, 16 cm, 14 cm, 12 cm, 10 cm, 9 cm, 8 cm, 7 cm, 6 cm, 5 cm, 4 cm, 3 cm, 2 cm, 1 cm, or less. In case where the bottles are cut into smaller pieces mechanically, each piece may vary from one another in size, volume or weight by less than or equal to about 20%, 18%, 16%, 15%, 14%, 13%, 12%, 11%, 10%, 9%, 8%, 7%, 6%, 5%, 4%, 3%, 2%, 1%, 0.5%, or less.

The bottles or pieces thereof may be crumpled into a compact shape or volume. In some cases, the bottles or pieces thereof are crumpled into the smallest volume so as to achieve a high specific surface area or surface area-to-volume ratio. The specific surface area may vary depending upon, for example, processes and/or methods for making the twisted and/or crumpled materials. In some cases, the crumpled materials have a surface area-to-volume ratio greater than or equal to about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.2, 4.4, 4.6, 4.8, 5.0, 5.5, 6.0, 6.5, 7.0, 7.5, 8.0 times or more than the original materials. The plastic materials, such as water bottles, may be crumpled manually or automatically.

The non-porous materials may comprise a layer of biofilm. The biofilm may be formed on a surface of the non-porous material. The layer of biofilm may have a thickness that is greater than or equal to about 0.1 µm, 0.2 µm, 0.3 µm, 0.4 µm, 0.5 µm, 0.6 µm, 0.7 µm, 0.8 µm, 0.9 µm, 1 µm, 1.5 µm, 2 µm, 2.5 µm, 3 µm, 3.5 µm, 4 µm, 4.5 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 22 µm, 22 µm, 24 µm, 26 µm, 28 µm, 30 µm, 32 µm, 34 µm, 36 µm, 38 µm, 40 µm, 42 µm, 44 µm, 46 µm, 48 µm, 50 µm, 52 µm, 54 µm, 56 µm, 58 µm, 60 µm, 80 µm, 100 µm, 125 µm, 150 µm, 175 µm, 200 µm, 220 µm, 240 µm, 260 µm, 280 µm, 300 µm or more. The layer of biofilm may have a thickness less than or equal to about 500 µm, 450 µm, 400 µm, 350 µm, 300 µm, 250 µm, 200 µm, 150 µm, 100 µm, 90 µm, 80 µm, 70 µm, 60 µm, 50 µm, 40 µm, 30 µm, 20 µm, 18 µm, 16 µm, 14 µm, 12 µm, 10 µm, 9 µm, 8 µm, 7 µm, 6 µm, 5 µm, 4 µm, 3 µm, 2 µm, 1 µm or less. In some cases, the biofilm has a thickness falling within a range of any of the two values described above, for example, between about 25 µm and about 250 µm.

The mesh bag comprising the non-porous material may be configured to reduce a concentration of one or more contaminants (such as bacteria, viruses, chemicals, salts, ions, and/or organic matters) comprised in the wastewater stream. The contaminants may be organic or inorganic matters or compounds. The contaminants may be solid, semi-solid or liquid. The contaminants may be hydrophilic, lipophilic or amphiphilic. Upon flow of the wastewater stream through the mesh bag over the non-porous material, a concentration of one or more contaminants may be reduced. In some cases, the concentration of at least one contaminant in the wastewater is reduced by at least 10%, 15%, 20%, 25%, 30%, 35%, 40%, 45%, 50%, 55%, 60%, 65%, 70%, 75%, 80%, 85%, 90%, 99%, or more.

The contaminants may comprise pathogens, chemicals, chemicals or minerals from the natural environment, or combinations thereof. The pathogens may include disease-causing organisms including bacteria, amoebas, viruses, as well as eggs and larvae of parasitic worms. The chemicals may be harmful chemicals from human activities such as industrial wastes, pesticides or fertilizers. The chemicals or minerals from the natural environment may comprise e.g., arsenic, salt, fluorides.

Non-limiting examples of pathogens may include, bacterial pathogens such as *Acinetobacter, Aeromonas, Bacillus, Burkholderia pseudomallei, Campylobacter, Escherichia coli* pathogenic strains, *Helicobacter pylori, Klebsiella, Legionella, Mycobacterium, Pseudomonas aeruginosa, Salmonella, Shigella, Staphylococcus aureus, Tsukamurella, Vibrio,* and *Yersinia;* viral pathogens such as adenoviruses, astroviruses, caliciviruses, enteroviruses, hepatitis a virus, hepatitis e virus, rotaviruses and orthoreoviruses; protozoan pathogens such as *Acanthamoeba, Balantidium coli, Cryptosporidium, Cyclospora cayetanensis, Entamoeba histolytica, Giardia intestinalis, Isospora belli, Microsporidia, Naegleria fowleri,* and *Toxoplasma gondii; Helminth* pathogens such as *Dracunculus medinensis* and *Fasciola* spp.; toxic cyanobacteria; indicator and index organisms such as total coliform bacteria, *Escherichia coli* and thermotolerant coliform bacteria, heterotrophic plate counts, intestinal enterococci, *Clostridium perfringens,* coliphages, bacteroides *Fragilis phages,* and enteric viruses; or combinations thereof.

Non-limiting examples of chemicals and/or chemicals and minerals from natural environment may include acrylamide, alachlor, aldicarb, aldrin and dieldrin, aluminium, ammonia, antimony, arsenic, asbestos, atrazine, barium, bentazone, benzene, boron, bromate, brominated acetic acids, cadmium, carbofuran, carbon tetrachloride, chloral hydrate (trichloroacetaldehyde), chlordane, chloride, chlorine, chlorite and chlorate, chloroacetones, chlorophenols (2-chlorophenol, 2,4-dichlorophenol, 2,4,6-trichlorophenol), chloropicrin, chlorotoluron, chlorpyrifos, chromium, copper, cyanazine, cyanide, cyanogen chloride, 2,4-D (2,4-dichlorophenoxyacetic acid), 2,4-DB, DDT and metabolites, dialkyltins, 1,2-dibromo-3-chloropropane (DBCP), 1,2-dibromoethane (ethylene dibromide), dichloroacetic acid, dichlorobenzenes (1,2-dichlorobenzene, 1,3-dichlorobenzene, 1,4-dichlorobenzene), 1,1-dichloroethane, 1,2-dichloroethane, 1,1-dichloroethene, 1,2-dichloroethene, dichloromethane, 1,2-dichloropropane (1,2-DCP), 1,3-dichloropropane, 1,3-dichloropropene, dichlorprop (2,4-DP), di(2-ethylhexyl)adipate, di(2-ethylhexyl)phthalate, dimethoate, 1,4-dioxane, diquat, edetic acid (EDTA), endosulfan, endrin, epichlorohydrin, ethylbenzene, fenitrothion, fenoprop (2,4,5-TP; 2,4,5-trichlorophenoxy propionic acid), fluoride, formaldehyde, glyphosate and AMPA, halogenated acetonitriles (dichloroacetonitrile, dibromoacetonitrile, bromochloroacetonitrile, trichloroacetonitrile), hardness, heptachlor and heptachlor epoxide, hexachlorobenzene (HCB), hexachlorobutadiene (HCBD), hydrogen sulfide, inorganic tin, iodine, iron, isoproturon, lead, lindane, malathion, manganese, MCPA [4-(2-methyl-4-chlorophenoxy)acetic acid], mecoprop (MCPP; [2(2-methyl-chlorophenoxy) propionic acid]), mercury, methoxychlor, methyl parathion, methyl tertiary-butyl ether (MTBE), metolachlor, microcystin-lr, molinate, molybdenum, monochloramine, monochloroacetic acid, monochlorobenzene, mx, nickel, nitrate and nitrite, nitrilotriacetic acid (NTA), parathion, pendimethalin, pentachlorophenol (PCP), permethrin, petroleum products, 2-phenylphenol and its sodium salt, polynuclear aromatic hydrocarbons (PAHs), propanil, pyriproxyfen, selenium, silver, simazine, sodium, styrene, sulfate, 2,4,5-T (2,4,5-trichlorophenoxyacetic acid), terbuthylazine (TBA), Tetrachloroethene, Toluene, Total dissolved solids (TDS), trichloroacetic acid, trichlorobenzenes (total), 1,1,1-trichloroethane, trichloroethene, trifluralin, trihalomethanes (bromoform, bromodichloromethane, dibromochloromethane, chloroform), uranium, vinyl chloride, xylenes, zinc, or combinations thereof.

In another aspect the present disclosure, methods for treating or processing wastewater are provided. The methods may comprise directing a wastewater stream to one or more processing units. The one or more processing units may be configured to receive the wastewater stream and perform one or more processing steps as described above or elsewhere herein on the wastewater stream. The one or more processing units may be in fluidic, thermal or electrical communication and associated with one another. The one or more processing steps may comprise a separation process, an anaerobic process, an aerobic process, a disinfection process, a purification process, a sterilization process, or combinations thereof. The separation process may separate a solid phase from a liquid phase of the wastewater stream. The anaerobic process may reduce a concentration of one or more anaerobic species comprised in the wastewater stream. The aerobic process may reduce a concentration of one or more aerobic species comprised in the wastewater stream. The disinfection process may reduce a concentration of one or more unwanted species or substances (such as viruses, bacteria) comprised in the wastewater stream. The methods may further comprise producing a product stream using the one or more processing units. The product stream may have drinking-water quality. A product stream having drinking-water quality may be a water stream that has certain contaminants with an amount or concentration within all regulatory limits set forth by United States Environmental Protection Agency (US EPA). For example, the product stream may be a water stream that meets contaminant standards are required by the Safe Drinking Water Act (SDWA) and/or National Primary Drinking Water Regulations (NPDWRs). The product stream may be a water stream that is at or below all US EPA Maximum contaminant levels (MCLs) and/or has required levels for various criteria as deemed both preferable and safe for human health. In some examples, the product stream may comprise little or no total coliforms/*Escherichia coli* (*E. coli*). In some cases, there is 0 parts per million (ppm) *E. coli* or total coliforms present in the product stream. In some cases, the product stream has a pH value between about 6 and 8.5.

The product stream has a quantity or volume that is substantially the same as the wastewater stream. For example, with a given amount (or quantity, volume) of a wastewater stream, the methods of the present disclosure may generate a product stream that has an amount (or quantity, volume) that is at least about 85%, 90%, 91%, 92%, 93%, 94%, 95%, 96%, 97%, 98%, 99% of that of the wastewater stream, or more. In some case, upon generation of the product stream, a ratio of a volume of the product stream to a volume of the wastewater stream is at least about 0.9, 0.91, 0.92, 0.93, 0.94, 0.95, 0.96, 0.97, 0.98, 0.99, or more.

The methods may further comprise collecting wastewater from various sources to produce the wastewater stream. The wastewater collected from various sources may comprise gray water, black water or combinations thereof.

The one or more processing units may be substantially passively operated. As such, operations of the one or more processing units may require minimal or no external energy input. The external energy may be mechanical energy, electrical energy, thermal energy or combinations thereof.

In some cases, the methods further comprise using a sensor to detect a property of the wastewater stream and/or the product stream. The sensor may be an inline sensor, an online sensor, or any types of sensors described above or elsewhere herein. Any number of sensors may be used in the methods, for example, at least about 2, 3, 4, 5, 6, 7, 8, 9, 10 sensors or more may be used. Any number of sensors may be used in connection with one or more of the processing units. In response to the property detected by the sensor, a fluid property of the wastewater stream and/or the product stream may be adjusted. For example, when the product stream has a concentration of aerobic species greater than a pre-determined level, a flow rate of the wastewater stream in an aerobic processing unit may be lowered so as to increase a residence time of the wastewater stream in the aerobic unit. In some cases, at least one of the one or more processing steps may be repeated in response to the property detected by the sensor. In some cases, at least one of the processing steps is repeated until a property of the product stream reaches a pre-determined value (e.g., required levels for various criteria deemed preferable and safe for human health). As will be appreciated, the wastewater stream may be subject to any number of cycles (each cycle comprising all processing steps) of treatment processes until one or more properties of the product stream meet a pre-determined standard.

Another aspect of the present disclosure provides methods for treating or processing wastewater. The methods may comprise directing a wastewater stream to a treatment unit. The wastewater stream may comprise gray water, black water or combinations thereof. The treatment unit may be configured to receive the wastewater stream and perform a treatment process on the wastewater stream. The treatment unit may generate an effluent stream which has a reduced concentration of solids (or solid components) than the wastewater stream. The solids may be sludge. Before, during or after the treatment process, the wastewater stream or the solids may be subjected to an additional treatment process. The additional treatment process may comprise an activated sludge process which oxygenates at least a portion of solid components separated from the wastewater stream to supercharge bacterial communities. In some cases, the treatment unit may remove at least about 50%, 55%, 60%, 65%, 70%, 75%, 80%, 85%, 90%, 95% (wt %) of solids originally comprised in the wastewater stream, or more. The treatment process may be performed for a certain time period (e.g., greater than or equal to about 10 hours (hrs), 12 hrs, 14 hrs, 16 hrs, 18 hrs, 20 hrs, 22 hrs, 24 hrs, 26 hrs, 28 hrs, 30 hrs, 32 hrs, 34 hrs, 36 hrs, 40 hrs, 44 hrs, 48 hrs, or more. In some cases, the treatment process is conducted until a concentration of solids of the effluent stream reduces to a predetermined level. For example, the treatment process may be conducted until the effluent stream comprises less than or equal to about 10%, 8%, 6%, 4%, 2%, 1% (wt %) solids or less. The treatment process may comprise a settling process, a sedimentation process, an anaerobic process or combinations thereof.

Next, the effluent stream may be directed to and through one or more (including e.g., two or more, three or more, or all of the) processing units. The one or more processing units may be configured to receive the effluent stream and perform one or more processing steps on the effluent stream while the effluent stream flows through the one or more processing units. The one or more processing units may generate a product stream. The product stream may have improved water quality as compared to the effluent stream and the wastewater stream. The product stream may have a reduced concentration of one or more unwanted species or components (e.g., bacteria, viruses, contaminants, pollutants, or any other disease-causing chemicals or species) as compared to the effluent stream and the wastewater stream. The product stream may have drinking-water quality. A product stream having drinking-water quality may be a water stream that has certain contaminants with an amount or concentration within all regulatory limits set forth by United States Environmental Protection Agency (US EPA). For example, the product stream may be a water stream that meets contaminant standards are required by the Safe Drinking Water Act (SDWA) and/or National Primary Drinking Water Regulations (NPDWRs). The product stream may be a water stream that is at or below all US EPA Maximum contaminant levels (MCLs) and/or has required levels for various criteria as deemed both preferable and safe for human health. In some examples, the product stream may comprise little or no total coliforms/*Escherichia coli* (*E. coli*). In some cases, there is 0 parts per million (ppm) *E. coli* or total coliforms present in the product stream. In some cases, the product stream has a pH value between about 6 and 8.5.

For example, the product stream may have a reduced concentration of microbes. In some cases, the product stream has a microbes concentration that is less than or equal to about 100 parts per million (ppm), 90 ppm, 80 ppm, 70 ppm, 60 ppm, 50 ppm, 40 ppm, 30 ppm, 20 ppm, 10 ppm, 9 ppm, 8 ppm, 7 ppm, 6 ppm, 5 ppm, 4 ppm, 3 ppm, 2 ppm, 1 ppm, 0.9 ppm, 0.8 ppm, 0.7 ppm, 0.6 ppm, 0.5 ppm, 0.4 ppm, 0.3 ppm, 0.2 ppm, 0.1 ppm, 0.08 ppm, 0.06 ppm, 0.04 ppm, 0.02 ppm, 0.01 ppm, or less. In some cases, the product stream comprises potable water.

With a given flow rate in the system (e.g., greater than or equal to about 0.01 L/s, 0.02 L/s, 0.03 L/s, 0.04 L/s, 0.05 L/s, 0.06 L/s, 0.07 L/s, 0.08 L/s, 0.09 L/s, 1 L/s, 2 L/s, 3 L/s, 4 L/s, 5 L/s, 6 L/s, 7 L/s , 8 L/s, 9 L/s, 10 L/s, 15 L/s, 20 L/s, or more), a residence time of the effluent stream in the one or more processing units may be less than or equal to about 5 hours, 4.5 hours, 4 hours, 3.5 hours, 3 hours, 2.5 hours, 2 hours, 1.5 hours, 1 hour or less. In some cases, the residence time of the effluent stream in the one or more processing units may be between any of the two values described above, for example, between about 1 hour and 2 hours. The residence time may be an average length of time that the effluent stream remains in the one or more processing unit to undergo all necessary processing steps. For example, the residence time may be a time period between a first time point when the effluent stream enters the one or more processing unit and a second time point when the product stream exits the one or more processing units. For a continuous flow system, the residence time may be determined by a difference between time points when a given amount (or quantity, volume) of the wastewater stream is directed into the one or more processing unit and when the same amount (or quantity, volume) of product stream is produced by the one or more processing unit. For example, for methods using a continuous flow, between $t_0$ and $t_1$, a certain amount of wastewater stream is directed into the one or more processing units, and using to as a starting point, until $t_2$, the same amount of product stream is generated by the one or more processing units, the residence time of the effluent stream is then determined as $(t_2-t_1)$.

Residence time may vary depending upon quantity or volume of the effluent stream which may be processed. In some cases, an average residence time for processing 100 liters (L) of the effluent stream is less than about 1 hours, 50 minutes (min), 45 min, 40 min, 35 min, 30 min, 25 min, 20 min, 15 min, 10 min, 5 min, 1 min or less. In some cases, the average residence time for every 100 L of the effluent stream may be between any of the two values described above, for example, between about 10 min and 25 min.

The effluent stream may have a volume that is greater than or equal to about 100 liters (L), 150 L, 200 L, 250 L, 300 L, 350 L, 400 L, 450 L, 500 L, 600 L, 700 L, 800 L, 900 L, 1,000 L, 1,500 L, 2,000 L, 2,500 L, 3,000 L, or more. In some cases, the effluent stream has a volume that is less than or equal to about 5,000 L, 4,500 L, 4,000 L, 3,500 L, 3,000 L, 2,000 L, 1,000 L, 800 L, 600 L, 400 L, 200 L or less. The methods of the present disclosure may be configured to process the wastewater stream and/or effluent stream efficiently. In some cases, an average time for the one or more processing units to produce an liter of the product stream is less than or equal to about 1 minute (min), 0.9 min, 0.8 min, 0.7 min, 0.6 min, 0.5 min, 0.4 min, 0.3 min, 0.2 min, 0.1 min, 0.08 min, 0.06 min, 0.04 min, or less.

In some cases, the methods further comprise flowing the wastewater stream and/or the effluent stream through a porous material (such as a mesh bag) comprising a non-porous material. The non-porous material may be enclosed in the porous material. The porous and non-porous materials may be any types of materials described above and elsewhere herein. Such treatment step (using the mesh bag comprising the non-porous material) and the treatment process, as well as the one or more processing steps may be conducted simultaneously, sequentially or alternately. In some cases, the porous material comprising the non-porous material may be comprised in an individual unit separate from the treatment unit and the one or more processing units. In some cases, the porous material comprising the non-porous material may be comprised and suspended in the treatment unit and/or some or all of the one or more processing units. In some examples, the one or more processing units comprise an anaerobic unit and an aerobic unit and each of the treatment unit, the anaerobic unit and the aerobic unit comprises a mesh bag comprising a non-porous material suspended therein. Flowing a water stream through the mesh bag may reduce a concentration of unwanted constituents, components or substances (e.g., microbes) from the water stream. For example, passing the wastewater stream through a mesh bag may reduce a concentration of microbes comprised in the wastewater stream.

In some cases, the methods further comprise detecting a property of the wastewater stream, the effluent stream and/or the product stream using one or more sensors. The sensors may be online sensors, inline sensors or combinations thereof. The sensors may be any type of sensors as described above or elsewhere herein. In response to the property detected by the sensors, a fluid property (such as fluid flow, direction, and flow rate) of the wastewater stream, the effluent stream and/or the product stream may be adjusted. In some cases, the fluid property is adjusted in real time in response to the property detected by the sensors. Fluid flow of a water stream (including the wastewater stream, effluent stream and product stream) may be regulated using pumps and valves. As provided herein, the pumps may comprise dosing pumps, timed pumps, transfer pumps, or any type of pumps suitable for regulating fluid flows.

In some cases, the methods further comprise recycling at least a portion of the product stream when a property of the product stream detected by the one or more sensors is higher than a pre-determined value. For example, when the product stream has a concentration of microbes higher than a pre-determined level, some or all of the product stream may be recycled and subjected to one or more additional cycles of the one or more processing steps. In some cases, at least a portion of the product stream is recycled when a property of the product stream detected by the one or more sensors is lower than a pre-determined value. In some cases, the treatment process and/or the one or more processing steps may be repeated in response to a property of the wastewater stream, the effluent stream and/or the product stream detected by the sensors. The processes may be repeated until the detected property meets a pre-determined standard (e.g., lower than or higher than a pre-determined value).

Systems

Also provided herein are systems for processing or treating wastewater. The systems may comprise a container. The container may be configured to receive and retain wastewater from various sources and to produce a wastewater stream. The wastewater stream may comprise gray water, black water or combinations thereof. The container may be of any shapes, regular or irregular. The container may be cylindrical, round, or box-shaped.

The system may further comprise one or more processing units. The one or more processing units may be in fluidic and/or thermal communications with one another. The one or more processing units may be in fluidic and/or thermal communications with the container. The one or more processing units may be connected in parallel, in series, or combinations thereof. The one or more processing units may be configured to perform one or more processing steps. As described above and elsewhere herein, the one or more processing steps may comprise separation processes, anaerobic processes, aerobic processes, disinfection processes, or combinations thereof. Non-limiting examples of the processing units may comprise sedimentation/septic tank, anaerobic filters, aerobic filters, roughing filters (such as upflow roughing filters or upflow clarifier), sand filters, activated carbon chamber, charcoal chamber, ozonation chamber, grinder, separation tank or combinations thereof. In some cases, the processing units comprise a charcoal chamber and an ozonation chamber in communication with each other. The ozonation chamber may comprise an ozonator which may generate ozone. Dose of ozone used in an ozonation chamber may be controlled or adjusted. The dose may be adjusted in response to one or more of detected properties (or parameters) that may be representative of a water quality.

In some cases, at least a portion of the ozone is recycled. For example, at least about 5%, 10%, 15%, 20%, 25%, 30%, 35%, 40%, 45%, 50% (vol %) of ozone may be recycled. The ozone may be recycled back to the charcoal chamber. The ozone recycling may enhance removal of organics, chemicals, heavy metals or other unwanted species or constituents from the water stream. In some cases, ozone recycling enhances the effectiveness of the activated charcoal. The one or more processing units may produce a product stream. The product stream may comprise treated water. The product stream may have drinking-water quality. A product stream having drinking-water quality may be a water stream that has certain contaminants with an amount or concentration within all regulatory limits set forth by United States Environmental Protection Agency (US EPA). For example, the product stream may be a water stream that meets contaminant standards are required by the Safe Drinking Water Act (SDWA) and/or National Primary Drinking Water Regulations (NPDWRs). The product stream may be a water stream that is at or below all US EPA Maximum contaminant levels (MCLs) and/or has required levels for various criteria as deemed both preferable and safe for human health. In some examples, the product stream may comprise little or no total coliforms/*Escherichia coli* (*E. coli*). In some cases, there is 0 parts per million (ppm) *E. coli* or total coliforms present in the product stream. In some cases, the product stream has a pH value between about 6 and 8.5.

The systems may further comprise one or more additional processing units. The one or more additional processing units may be in fluidic and/or thermal communications with one another. The one or more additional processing units may be in fluidic and/or thermal communications with the container and/or the one or more processing units. The additional processing units may be configured to receive the wastewater stream or an effluent stream from the one or more processing units and permit at least a portion of (e.g., at least about 5%, 10%, 15%, 20%, 25%, 30%, 35%, 40%, 45%, 50%, 55%, 60%, 65%, 70 vol %, or more) the wastewater stream or the effluent stream to be subjected to one or more additional processing steps to generate the product stream that meets the drinking water standard.

The product stream may have a microbes concentration that is less than or equal to about 100 parts per million (ppm), 90 ppm, 80 ppm, 70 ppm, 60 ppm, 50 ppm, 40 ppm, 30 ppm, 20 ppm, 10 ppm, 9 ppm, 8 ppm, 7 ppm, 6 ppm, 5 ppm, 4 ppm, 3 ppm, 2 ppm, 1 ppm, 0.9 ppm, 0.8 ppm, 0.7 ppm, 0.6 ppm, 0.5 ppm, 0.4 ppm, 0.3 ppm, 0.2 ppm, 0.1 ppm, 0.08 ppm, 0.06 ppm, 0.04 ppm, 0.02 ppm, 0.01 ppm, or less. In some cases, the product stream comprises potable water.

In some cases, the additional processing units comprise an additional separation unit. The additional separation unit may be configured to receive the wastewater stream from the container and perform an additional separation process on the wastewater stream. The additional separation process may be performed prior to the one or more processing steps. The additional separation process may separate at least a portion of solid wastes or solid components form the wastewater stream.

The container, the processing units, and/or the additional processing units may be of any shapes, regular or irregular. The container, the processing units, and/or the additional processing units may be wastewater treatment tanks. The container, the processing units, and/or the additional processing units may have the same or different properties or characteristics, including such as, volume, weight, height, width, depth, diameter, and/or footprint.

The systems may further comprise a waste tank. The waste tank may be in communication with the additional separations unit and configured to receive the solid components separated in the additional separation process. In some cases, the system further comprises an incineration unit. The incineration unit may be configured to receive at least a portion of the solid components from the waste tank and/or the additional processing unit. The incineration unit may be configured to perform an incineration process on the solid components. In some cases, the system further comprises a grinder. The grinder may be configured to receive at least a portion of the solid components from the waste tank and/or the additional processing unit and grind the solid components into small pieces.

The container, the one or more processing units and/or the additional processing units may comprise a porous material. The porous material may be a mesh bag. A given unit may comprise a plurality of mesh bags. For example, a unit may comprise at least about 2, 3, 4, 5, 6, 7, 8, 9, 10 mesh bags, or more. The mesh bag(s) may be suspended in the unit (e.g., the container, the processing units and/or the additional processing units). In cases where a unit comprises multiple mesh bags, each mesh bag may have the same or a different average pore size. Each mesh bag may be configured to retain the same or a different fluid volume.

The mesh bag may contain a non-porous material as described above or elsewhere herein. The non-porous material may be solid materials or semi-solid materials. The non-porous material may take various shapes, regular or irregular. The non-porous material may have a volume. The volume may vary. The volume may be greater than or equal to about 10 cubic centimeter ($cm^3$), 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 200 $cm^3$, 300 $cm^3$, 400 $cm^3$, 500 $cm^3$, 600 $cm^3$, 700 $cm^3$, 800 $cm^3$, 900 $cm^3$, 1,000 $cm^3$, or more. The volume may be less than equal to about 5,000 $cm^3$, 4,000 $cm^3$, 3,000 $cm^3$, 2,000 $cm^3$, 1,000 $cm^3$, 800 $cm^3$, 600 $cm^3$, 400 $cm^3$, 200 $cm^3$, 100 $cm^3$, or less. In some cases, the volume is between any of the two values described above.

The mesh bag may comprise a plurality of pores. As described above and elsewhere herein, the plurality of pores may have an average pore size that is greater than or equal to about 50 micron (μm), 100 μm, 150 μm, 200 μm, 300 μm, 400 μm, 500 μm, 600 μm, 700 μm, 800 μm, 900 μm, 1 millimeter (mm), 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 11 mm, 12 mm, 13 mm, 14 mm, 15 mm, or more. In some cases, the average pore size is less than or equal to about 20 mm, 18 mm, 16 mm, 14 mm, 12 mm, 10 mm, 8 mm, 6 mm, 4 mm, 2 mm, 1 mm, or less. In some cases, the average pore size is between any of the two values described above, for example, between about 1 mm and about 10 mm.

The mesh bag may be able to retain a fluid volume. The fluid volume may be retained for a specified time period. The fluid volume may vary over time during the process. The fluid volume may vary, depending upon various factors including, e.g., quantity or volume of water to be treated, volume of a given unit in which the mesh bag may be comprised, total number of mesh bags in a given unit, size of the entire system, flow rate of the water stream, properties (such as length, height, weight, volume, type) of the non-porous materials and/or other materials within the system, or combinations thereof. In some cases, the mesh bag is able to retain a fluid volume greater than about 0.01 liters (L), 0.05 L, 0.1 L, 0.2 L, 0.3 L, 0.4 L, 0.5 L, 0.6 L, 0.7 L, 0.8 L, 0.9 L, 1 L, 2 L, 3 L, 4 L, 5 L, 6 L, 7 L, 8 L, 9 L, 10 L, 20 L, 30 L, 40 L, 50 L, 60 L, 70 L, 80 L, 90 L, 100 L, 120 L, 140 L, 160 L, 180 L, 200 L or more. In some cases, the mesh bag is able to retain a fluid volume less than or equal to about 500 L, 400 L, 300 L, 250 L, 200 L, 150 L, 100 L, 80 L, 60 L, 40 L, 20 L, 18 L, 16 L, 14 L, 12 L, 10 L, 8 L, 6 L, 4 L, 2 L, 1 L, 0.5 L, 0.1 L, or less. In some cases, the mesh bag is configured to retain a fluid volume that is between any of the two values described above, for example, about 1.2 L. The mesh bag may be configured to retain a fluid volume for a specific time period (e.g., at least about 1 hour (hr), 2 hrs, 3 hrs, 4 hrs, 5 hrs, 6 hrs, 7 hrs, 8 hrs, 9 hrs, 10 hrs, 11 hrs, 12 hrs, 13 hrs, 14 hrs, 15 hrs, 16 hrs, 17 hrs, 18 hrs, 19 hrs, 20 hrs, 21 hrs, 22 hrs, 23 hrs, 24 hrs or more) so as to provide sufficient contact time between a fluid stream and a biofilm layer formed on a surface of the non-porous material.

In some cases, a given unit in which a mesh bag may be comprised may comprise one or more materials which fill at least a portion of unoccupied spaces in the unit. The materials may be solids, semi-solids, liquids or combination thereof. The materials may fill at least a portion of (e.g., at least about 1%, 5%, 10%, 15%, 20%, 25%, 30%, 35%, 40%, 45%, 50 vol %, or more) the space unoccupied by the mesh bag(s). For example, in cases where a unit (such as a tank, a container) comprises multiple mesh bags, the materials may fill some or all of the space between the mesh bags.

The container, the processing units, and/or the additional processing units may be made of various materials. In some cases, one or more of the container, the processing units, and the additional processing units are made of plastic materials, including type 1-, type 2-, type 3-, type 4-, type 5-, type 6-, type 7-plastics or any other types of plastics or combinations thereof. The hoses or tubing that connects various individual units may also be made of plastic materials.

The container, the processing units and/or the additional processing units may comprise one or more materials. The materials may be solids, semi-solids, liquids, or combinations thereof. The materials may be synthetic materials, semi-synthetic materials, natural materials, or combinations thereof. The materials may comprise organic materials, inorganic materials, or combinations thereof. Each of the container, the processing units and the additional processing units may comprise a single type of materials or multiple types of materials. The materials may facilitate a wastewater treatment process. The materials may comprise sand, gravel, fiber, fiberglass, ceramics, iron filings, or combinations thereof. The materials may form a fixed bed and/or a mobile matrix in a given unit (such as container, tank). Some of the materials may be configured to facilitate the formation of microorganisms or a biofilm layer, for example, the formation of a biofilm layer on the non-porous material(s) in the mesh bag. In some examples, the processing units may comprise sand filters which may further comprise iron filings. The sand filters comprising the iron filings may be configured to reduce a concentration of viruses comprised in a water stream which may be directed into the sand filters.

The systems may comprise a sensor or a plurality of sensors. The sensor(s) may be in electric, fluidic and/or thermal communications with the container, the processing units and/or the additional processing units. The sensor(s) may comprise an inline sensor, an online sensor, or a combination thereof. The sensor(s) may detect one or more properties of a fluid stream (e.g., the wastewater stream, an effluent stream generated in any of the container, the processing units and the additional processing units, the product stream). The sensor(s) may detect one or more properties from the container, the processing units and/or the additional processing units. The properties may comprise temperature, pressure, flow rate, total or dissolved organic carbon, pH, conductivity, oxidoreduction potential, turbidity, color, UV absorption or any other measurable properties of the wastewater stream, the effluent stream, and/or the product stream. The property may also comprise concentrations of one or more contents such as contaminants in the wastewater stream, the effluent stream, and/or the product stream. In some cases, the properties comprise temperatures, pressures, inlet/outlet flow rates or any other measurable properties of container, the processing units and/or the additional processing units. A fluid property such as a flow rate of the wastewater stream, the effluent stream, and/or the product stream may be adjusted in response to the properties detected using the sensor(s). The sensor may be used to sense a level of a given constituent (e.g., contaminant) in a fluid in real time, substantially in real time, or every at least about 1 second, 30 seconds, 1 minute, 10 minutes, 30 minutes, 1 hour, 2 hours, 3, hours, 4 hours, 5 hours, 6 hours, 12 hours, 1 day, 2 days, 3 days, 4 days, 5 days, 1 week, 2 weeks, 3 weeks, 1 month, 2 months, 3 months, 4 months, 5 months, 6 months, or more.

A sensor may be a diffraction or scattering based sensor, such as a sensor based on light (e.g., laser) or ultrasound. The sensor may be an impedance or conductivity based sensor.

The sensor may be situated at various positions of the process flow. For example, the sensor may be positioned after the container receiving the wastewater stream but before the processing units. As another example, the sensor may be positioned at the end of the process flow, such as after the processing unit(s) and/or the additional processing unit(s).

In some examples, the sensor is a gene chip based sensor, which may include a panel of probes that are directed to various pathogens, such as bacteria. An example of such sensor is a hybridization array by Affymetrix. Such sensor may be used to collect a sample of fluid and directed to testing every at least about 1 hour, 2 hours, 3, hours, 4 hours, 5 hours, 6 hours, 12 hours, 1 day, 2 days, 3 days, 4 days, 5 days, 1 week, 2 weeks, 3 weeks, 1 month, 2 months, 3 months, 4 months, 5 months, or 6 months.

In some cases, the sensor is a chip comprising a microarray such as a DNA microarray. An example of such sensor is a Phylochip by Lawrence Berkeley National Laboratory. In some cases, the DNA microarray is a DNA hybrid microarray. The DNA microarray may be configured for rapid profiling of microbial populations. The rapid profiling may identify and measure the relative abundance of more than about 10,000, 20,000, 30,000, 40,000, 50,000, 60,000, 70,000, 80,000, 90,000, 100,000 microbial taxa or more in complex samples, as well as their source points. In some cases, each chip comprises at least about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.2, 2.4, 2.6, 2.8, 3.0, 3.5, 4.0, 4.5, 5.0 million or more probes. Each chip may comprise one or more (e.g., greater than or equal to about 2, 3, 4, 5, 6, 7, 8, 9, 10, 11, 12, 13, 14, 15, 16, 17, 18, 19, 20 or more) variable regions of specific types of gene sequences. In one example, a chip comprises nine variable regions of the 16S ribosomal RNA (rRNA) gene sequence, which may act as a "fingerprint" for specific microbes/pathogens. A sensing process may rely on some or all of the variable regions on the chip and allow identification of dominant microbial community members and the most likely source(s) of contamination. Multiple probes on the microarray may enable an identification/determination of at least about 1,000, 2,000, 3,000, 4,000, 5,000, 6,000, 7,000, 8,000, 9,000, 10,000, 12,000, 14,000, 16,000, 18,000, 20,000 or more microorganisms including, e.g., the most common and/or dangerous strains of microorganisms.

In some cases, at least one of the container, the processing units and the additional processing units comprises one or more compartments or subunits. For example, one or more of the processing units may comprise one or more subunits. Each subunit may be configured to perform a single or multiple processing steps. The subunits may comprise one or more types of materials and/or media that may facilitate the processes. Suitable types of materials/media are described above or elsewhere herein. For example, in some cases, a given subunit is configured to perform an anaerobic process. The subunit may comprise a non-porous material of the present disclosure. The subunit may comprise iron filings. The subunit may comprise any materials that may facilitate the anaerobic process. In some examples, a given subunit is configured to perform a trickling process. The subunit may comprise a non-porous material as described above and elsewhere herein. The subunit may also comprise materials that may facilitate the anaerobic and/or aerobic processes. In some examples, a given subunit is configured to perform a roughing filtration process. The subunit may comprise one or more filtration media that may facilitate the roughing filtration process. In some examples, a subunit configured to perform a purification process comprises charcoals. In some cases, a subunit configured to perform a disinfection process comprises an ozonator.

As provided herein, one or more structural components of the systems (e.g., the container, the processing units, the additional processing units) may be integrated with one another. In some cases, one or more of the structural components may be retrofitted into an existing plumbing system, such as an existing domestic or industrial plumbing system. In some cases, all structural components are integrated together to form an integrated wastewater treatment system. Such integrated system may be integrated with an existing domestic and/or industrial plumbing system.

The integrated wastewater treatment system may be included in a housing having various components described herein. The housing may be portable. In some cases, systems of the present disclosure further comprise a computer processor. The computer processor may be operatively coupled to the container, the processing units, the additional processing units, or any other structural/functional components of the system.

In some cases, the systems further comprise a computer control unit. The computer control unit may be programmed to control fluid flow rate of the wastewater stream, an effluent stream and/or the product stream in the container, the processing units, and/or the additional processing units. The computer control unit may be programmed to control fluid flow rate of the wastewater stream, the effluent stream and/or the product stream from and to the container, the processing units, and/or the further processing units. In some cases, the computer control unit is programmed to direct fluid flow among the container, the processing units, and/or the additional processing units. In some cases, the computer control unit is programmed to monitor operations of the container, the processing units, the additional processing units, and/or any other structural/functional components of the system. In some cases, the one or more processing units comprise less than or equal to about 10, 9, 8, 7, 6, 5, 4, 3, 2, or 1 unit.

In some cases, the systems further comprise an energy supply unit. The energy supply unit may be configured to provide thermal energy for a sterilization process. The energy supply unit may comprise a panel collector and/or a plurality of optical lenses or optical mirrors. The optical lenses or optical mirrors may be configured to concentrate solar thermal energy. In some cases, the energy supply unit may convert at least a portion of the solar energy to electrical energy. At least some or all of the electrical energy may be used for operating some of or the entire system. The systems may also comprise hoses or tubing to carry the fluid or water stream. In some cases, the systems comprise pumps, valves and/or actuators.

In some cases, some or all of the individual units including the container, the processing units, the additional processing units, the sensors, and/or the energy supply unit are modular units of a single system. Some or all of the modules may be enclosed in one single container or housing. In some cases, the systems of the present disclosure have a small footprint. The footprint of the system may be less than or equal to about 10 m², 9 m², 8 m², 7 m², 6 m², 5 m², 4 m², 3 m², 2 m², 1 m², 0.9 m², 0.8 m², 0.7 m², 0.6 m², 0.5 m², 0.4 m², 0.3 m², 0.2 m², 0.1 m², or less. In some cases, the system of the present disclosure has a weight less than or equal to about 20 kilograms (kg), 19 kg, 18 kg, 17 kg, 16 kg, 15 kg, 14 kg, 13 kg, 12 kg, 11 kg, 10 kg, 9 kg, 8 kg, 7 kg, 6 kg, 5 kg, 4 kg, 3 kg, 2 kg, 1 kg, or less.

In some aspects of the present disclosure, systems for processing or treating wastewater may comprise one or more processing units. The one or more processing units may be any processing units or additional processing units as described above or elsewhere herein. The one or more processing units may be configured to receive a wastewater stream and perform one or more processing steps on the wastewater stream. The one or more processing units may be in fluidic, thermal or electrical communication with and associated with one another.

The one or more processing steps may comprise a separation process, an anaerobic process, an aerobic process, a disinfection process, a purification process, a sterilization process, or combinations thereof. The separation process may separate a solid phase from a liquid phase of the wastewater stream. The anaerobic process may reduce a concentration of one or more anaerobic species comprised in the wastewater stream. The aerobic process may reduce a concentration of one or more aerobic species comprised in the wastewater stream. The disinfection process may reduce a concentration of one or more unwanted species or substances (such as viruses, bacteria) comprised in the wastewater stream. The systems of the present disclosure comprising the one or more processing units may generate from the wastewater stream a product stream. The product stream may have drinking-water quality. A product stream having drinking-water quality may be a water stream that has certain contaminants with an amount or concentration within all regulatory limits set forth by United States Environmental Protection Agency (US EPA). For example, the product stream may be a water stream that meets contaminant standards are required by the Safe Drinking Water Act (SDWA) and/or National Primary Drinking Water Regulations (NPDWRs). The product stream may be a water stream that is at or below all US EPA Maximum contaminant levels (MCLs) and/or has required levels for various criteria as deemed both preferable and safe for human health. In some examples, the product stream may comprise little or no total coliforms/*Escherichia coli* (*E. coli*). In some cases, there is 0 parts per million (ppm) *E. coli* or total coliforms present in the product stream. In some cases, the product stream has a pH value between about 6 and 8.5.

The product stream may have a quantity or volume that is substantially the same as the wastewater stream. For example, for a given amount (or quantity, volume) of a wastewater stream, the systems of the present disclosure may generate a product stream that has an amount (or quantity, volume) that is at least about 85%, 90%, 91%, 92%, 93%, 94%, 95%, 96%, 97%, 98%, 99% of that of the wastewater stream, or more. In some case, upon generation of the product stream, a ratio of a volume of the product stream to a volume of the wastewater stream is at least about 0.9, 0.91, 0.92, 0.93, 0.94, 0.95, 0.96, 0.97, 0.98, 0.99, or more.

In some cases, the systems further comprise a holding tank. The holding tank may be in fluidic, thermal or electrical communication with the one or more processing units. The holding tank may be configured to receive and retain wastewater from a variety of sources and produce a wastewater stream comprising the wastewater. The wastewater stream may comprise gray water, black water or combinations thereof. The holding tank may allow for greater control of flow rate and residence time of water streams in the system. For example, the holding tank, when used in combination with pumps and valves, may allow the wastewater stream to enter the following processing steps at predetermined intervals as determined by water levels using a float switch, and/or on demand.

In some cases, at least some of the processing units comprise a mesh bag as described above or elsewhere herein. The mesh bag may comprise a non-porous material. The non-porous material may comprise plastic materials. The plastic materials may be polymeric materials. Various types of non-porous materials may be used, such as non-porous materials described above or elsewhere herein.

The non-porous material may comprise a layer of biofilm. The biofilm may be formed on a surface of the non-porous material. The layer of biofilm may have a thickness that is greater than or equal to about 0.1 µm, 0.2 µm, 0.3 µm, 0.4 µm, 0.5 µm, 0.6 µm, 0.7 µm, 0.8 µm, 0.9 µm, 1 µm, 1.5 µm, 2 µm, 2.5 µm, 3 µm, 3.5 µm, 4 µm, 4.5 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 22 µm, 22 µm, 24 µm, 26 µm, 28 µm, 30 µm, 32 µm, 34 µm, 36 µm, 38 µm, 40 µm, 42 µm, 44 µm, 46 µm, 48 µm, 50 µm, 52 µm, 54 µm, 56 µm, 58 µm, 60 µm, 80 µm, 100 µm, 125 µm, 150 µm, 175 µm, 200 µm, 220 µm, 240 µm, 260 µm, 280 µm, 300 µm or more. The layer of biofilm may have a thickness less than or equal to about 500 µm, 450 µm, 400 µm, 350 µm, 300 µm, 250 µm, 200 µm, 150 µm, 100 µm, 90 µm, 80 µm, 70 µm, 60 µm, 50 µm, 40 µm, 30 µm, 20 µm, 18 µm, 16 µm, 14 µm, 12 µm, 10 µm, 9 µm, 8 µm, 7 µm, 6 µm, 5 µm, 4 µm, 3 µm, 2 µm, 1 µm or less. In some cases, the biofilm has a thickness falling within a range of any of the two values described above, for example, between about 25 µm and about 250 µm. Upon flow of a water stream through the mesh bag comprising the non-porous material, a concentration of one or more unwanted constituents or components (such as bacteria, viruses, toxics, contaminants, pollutants) comprised in the water stream may be reduced. Such concentration reduction may be substantially facilitated by the biofilm layer.

The one or more processing units may comprise sand filters. The sand filters may comprise rapid sand filters, slow sand filters or combinations thereof. The sand filters may be substantially passively operated. The sand filters may be operated in the absence of enteral energy input. The external energy may comprise electrical energy, mechanical energy, thermal energy or combinations thereof. In some cases, the sand filters are operated using gravity which thus requires minimal or no external energy.

In some cases, the systems of the present disclosure are predominantly passive. For example, substantially all of the system (at least about 80%, 85%, 90%, 95%, or more) are passively operated which require minimal or no external energy input. Thus, the systems of the present disclosure can be energy efficient. For example, as compared to a system which requires heavy machinery and electrical input, energy consumed by the systems of the present disclosure to process the same amount of wastewater may be reduced by at least about 50%, 55%, 60%, 65%, 70%, 75%, 80%, 85%, 90%, or more.

The systems may further comprise one or more pumps configured to regulate fluid flow of the wastewater stream, the product stream, or effluent streams generated by a given unit of the one or more processing units. The pumps may be a dosing pump, a timed pump, a transfer pump or combinations thereof. The pumps may be operably coupled with the one or more processing units, the holding tank or any other units comprised in the systems.

In some cases, the systems further comprise one or more sensors. The sensors may be any sensors described above or elsewhere herein. The sensors may be configured to detect or monitor one or more properties of the wastewater stream, the product stream and/or an effluent stream generated by a given unit of the one or more processing units. The sensors may be configured to detect or monitor one or more properties of the system. The one or more properties may comprise operation parameters or conditions of the system, such as pressures, temperatures of the system. In response to the properties detected by the sensors, a fluid property (such as flow rate, flow direction) of the wastewater stream, the product stream and/or the effluent stream may be adjusted. In some cases, the adjustment is in real time. The system may be comprised of individual, free standing components.

In some cases, some or all of the units or components of the systems are modular units or components. The units or components may comprise processing units, fluidic tanks, sensors, pumps, valves, tubes and hoses, or any other components or units that may be required for a wastewater treatment process. The units or components may be associated with each other. The units or components of the systems may be enclosed in a single container. The container may be of various shapes, regular or irregular. The units or components may be assembled in a pre-defined orders or sequences. The orders or sequences may be adjusted on demand or based upon different applications. For example, the same set of units or components may be assembled in different orders for treating a gray water stream and a black water stream. In some cases, depending upon specific applications or compositions of wastewater to be treated, the systems may comprise the same or a different number and/or type of units or components. The systems may comprise one or more (e.g., at least 2, 3, 4, 5, 6, 7, 8, 9, 10 or more) of a certain type of units or components. For example, for a wastewater comprising a high concentration or a large amount of anaerobic species or aerobic species, the systems may comprise more than one anaerobic unit or aerobic unit so as to make sure the concentration of anaerobic species or aerobic species may be reduced to or below a pre-determined level. In some cases, as the treatment progresses, one or more of the units or components may be added, removed or substituted from the system.

As described above or elsewhere herein, the systems may be retrofitted into an existing plumbing system. The systems may be integrated with one or more existing plumbing systems. The systems may be substantially made of plastic materials or any types of materials that have a light weight. In some cases, the systems of the present disclosure have a small footprint. The footprint of the system may be less than or equal to about 10 $m^2$, 9 $m^2$, 8 $m^2$, 7 $m^2$, 6 $m^2$, 5 $m^2$, 4 $m^2$, 3 $m^2$, 2 $m^2$, 1 $m^2$, 0.9 $m^2$, 0.8 $m^2$, 0.7 $m^2$, 0.6 $m^2$, 0.5 $m^2$, 0.4 $m^2$, 0.3 $m^2$, 0.2 $m^2$, 0.1 $m^2$, or less. In some cases, the system of the present disclosure has a weight less than or equal to about 20 kilograms (kg), 19 kg, 18 kg, 17 kg, 16 kg, 15 kg, 14 kg, 13 kg, 12 kg, 11 kg, 10 kg, 9 kg, 8 kg, 7 kg, 6 kg, 5 kg, 4 kg, 3 kg, 2 kg, 1 kg, or less.

In some aspects of the present disclosure, systems for processing or treating wastewater comprise a treatment unit and one or more processing units. The treatment unit may be configured to receive a wastewater stream and perform a treatment process on the wastewater stream to generate an effluent stream. The effluent stream may have a reduced concentration of solid components (or solids) than the wastewater stream. The wastewater stream may comprise gray water, black water or combinations thereof. In some cases, the treatment unit may remove at least about 50%, 55%, 60%, 65%, 70%, 75%, 80%, 85%, 90%, 95% (wt %) of solids originally comprised in the wastewater stream, or more. The treatment process may be performed for a certain time period (e.g., greater than or equal to about 10 hours (hrs), 12 hrs, 14 hrs, 16 hrs, 18 hrs, 20 hrs, 22 hrs, 24 hrs, 26 hrs, 28 hrs, 30 hrs, 32 hrs, 34 hrs, 36 hrs, 40 hrs, 44 hrs, 48 hrs, or more. In some cases, the treatment process is conducted until a concentration of solids of the effluent stream reduces to a pre-determined level. For example, the treatment process may be conducted until the effluent stream comprises less than or equal to about 10%, 8%, 6%, 4%, 2%, 1% (wt %) solids or less. The treatment process may comprise a settling process, a sedimentation process, an anaerobic process or combinations thereof. In some cases, the treatment unit is a septic tank.

The one or more processing units may be in communication (e.g., fluidic communication, electrical communication, thermal communication) with one another. The one or more processing units may be in communication (e.g., fluidic communication, electrical communication, thermal communication) with the treatment unit. The one or more processing units may be in communication (e.g., fluidic communication, electrical communication, thermal communication) with any other components or units of the system. The one or more processing units may be configured to receive at least a portion (e.g., at least about 10%, 20%, 30%, 40%, 50%, 60%, 70%, 80%, 90% (vol %) or more) of the effluent stream. The one or more processing units may be configured to perform one or more processing steps on the effluent stream. The one or more processing steps may be any processing steps as described above or elsewhere herein. For example, the one or more processing steps may comprise a separation process, an anaerobic process, an aerobic process, a disinfection process or combinations thereof. The one or more processing units may comprise any processing units that may be used for water treatment or processing, such as processing units as described above or elsewhere herein. In some cases, the one or more processing units comprise a separation unit, an anaerobic unit, an aerobic unit, a disinfection unit, a holding tank, a purification unit, an ozonation unit, a charcoal unit, a sedimentation unit, or combinations thereof. The one or more processing units may generate a product stream from the effluent stream. The product stream may have drinking-water quality. A product stream having drinking-water quality may be a water stream that has certain contaminants with an amount or concentration within all regulatory limits set forth by United States Environmental Protection Agency (US EPA). For example, the product stream may be a water stream that meets contaminant standards are required by the Safe Drinking Water Act (SDWA) and/or National Primary Drinking Water Regulations (NPDWRs). The product stream may be a water stream that is at or below all US EPA Maximum contaminant levels (MCLs) and/or has required levels for various criteria as deemed both preferable and safe for human health. In some examples, the product stream may comprise little or no total coliforms/*Escherichia coli* (*E. coli*). In some cases, there is 0 parts per million (ppm) *E. coli* or total coliforms present in the product stream. In some cases, the product stream has a pH value between about 6 and 8.5.

The product stream may have improved water quality as compared to the effluent stream and the wastewater stream. The product stream may have a reduced concentration of one or more unwanted species or components (e.g., bacteria, viruses, contaminants, pollutants, or any other disease-causing chemicals or species) as compared to the effluent stream and the wastewater stream. For example, the product stream may have a reduced concentration of microbes. In some cases, the product stream has a microbes concentration that is less than or equal to about 100 parts per million (ppm), 90 ppm, 80 ppm, 70 ppm, 60 ppm, 50 ppm, 40 ppm, 30 ppm, 20 ppm, 10 ppm, 9 ppm, 8 ppm, 7 ppm, 6 ppm, 5 ppm, 4 ppm, 3 ppm, 2 ppm, 1 ppm, 0.9 ppm, 0.8 ppm, 0.7 ppm, 0.6 ppm, 0.5 ppm, 0.4 ppm, 0.3 ppm, 0.2 ppm, 0.1 ppm, 0.08 ppm, 0.06 ppm, 0.04 ppm, 0.02 ppm, 0.01 ppm, or less. In some cases, the product stream comprises potable water.

With a given flow rate in the system (e.g., greater than or equal to about 0.01 L/s, 0.02 L/s, 0.03 L/s, 0.04 L/s, 0.05 L/s, 0.06 L/s, 0.07 L/s, 0.08 L/s, 0.09 L/s, 1 L/s, 2 L/s, 3 L/s, 4 L/s, 5 L/s, 6 L/s, 7 L/s, 8 L/s, 9 L/s, 10 L/s, 15 L/s, 20 L/s, or more), a residence time of the effluent stream in the one or more processing units may be less than or equal to about 5 hours, 4.5 hours, 4 hours, 3.5 hours, 3 hours, 2.5 hours, 2 hours, 1.5 hours, 1 hour or less. In some cases, the residence time of the effluent stream in the one or more processing units may be between any of the two values described above, for example, between about 1 hour and 2 hours. The residence time may be an average length of time that the effluent stream remains in the one or more processing unit to undergo all necessary processing steps. For example, the residence time may be a time period between a first time point when the effluent stream enters the one or more processing unit and a second time point when the product stream exits the one or more processing units. For a continuous flow system, the residence time may be determined by a difference between time points when a given amount (or quantity, volume) of the wastewater stream is directed into the one or more processing unit and when the same amount (or quantity, volume) of product stream is produced by the one or more processing unit. For example, for methods using a continuous flow, between $t_0$ and $t_1$, a certain amount of wastewater stream is directed into the one or more processing units, and using to as a starting point, until $t_2$, the same amount of product stream is generated by the one or more processing units, the residence time of the effluent stream is then determined as $(t_2-t_1)$.

Residence time may vary depending upon quantity or volume of the effluent stream which may be processed. In some cases, an average residence time for processing 100 liters (L) of the effluent stream is less than about 1 hours, 50 minutes (min), 45 min, 40 min, 35 min, 30 min, 25 min, 20 min, 15 min, 10 min, 5 min, 1 min or less. In some cases, the average residence time for every 100 L of the effluent stream may be between any of the two values described above, for example, between about 10 min and 25 min. The average residence time may be adjusted in response to the property detected by the sensors. For example, when the product stream comprises certain types of viruses at a concentration higher than a pre-determined value, the average residence time may be increased to prolong the duration of interaction between the effluent stream and one or more processing media.

The effluent stream may have a volume that is greater than or equal to about 100 liters (L), 150 L, 200 L, 250 L, 300 L, 350 L, 400 L, 450 L, 500 L, 600 L, 700 L, 800 L, 900 L, 1,000 L, 1,500 L, 2,000 L, 2,500 L, 3,000 L, or more. In some cases, the effluent stream has a volume that is less than or equal to about 5,000 L, 4,500 L, 4,000 L, 3,500 L, 3,000 L, 2,000 L, 1,000 L, 800 L, 600 L, 400 L, 200 L or less. The methods of the present disclosure may be configured to process the wastewater stream and/or effluent stream efficiently. In some cases, an average time for the one or more processing units to produce an liter of the product stream is less than or equal to about 1 minute (min), 0.9 min, 0.8 min, 0.7 min, 0.6 min, 0.5 min, 0.4 min, 0.3 min, 0.2 min, 0.1 min, 0.08 min, 0.06 min, 0.04 min, or less.

The systems may further comprise a holding tank. The holding tank may be in fluidic, thermal or electrical communication with treatment unit and/or the one or more processing units. The holding tank may be configured to receive and retain wastewater from a variety of sources. The holding tank may retain the wastewater for a pre-defined period of time. The holding tank may be configured to retain a fluid volume that is greater than or equal about 100 L, 150 L, 200 L, 250 L, 300 L, 350 L, 400 L, 450 L, 500 L, 600 L, 700 L, 800 L, 900 L, 1,000 L, 1,500 L, 2,000 L, 2,500 L, 3,000 L, or more. The holding tank may retain a fluid volume that is less than or equal to about 5,000 L, 4,500 L, 4,000 L, 3,500 L, 3,000 L, 2,000 L, 1,000 L, 800 L, 600 L, 400 L, 200 L or less. The holding tank may retain a fluid volume that is between any of the two values described above, for example, between 250 L and 400 L. In some cases, the holding tank is part of the treatment unit. In some cases, the holding tank is upstream of the treatment unit.

The holding tank may be configured to produce a wastewater stream comprising the wastewater. The wastewater stream may comprise gray water, black water or combinations thereof. The holding tank may allow for greater control of flow rate and residence time of water streams in the system. For example, the holding tank, when used in combination with pumps and valves, may allow the wastewater stream to enter the following processing steps at predetermined intervals as determined by water levels using a float switch, and/or on demand. For example, the holding tank may be configured to regulate a fluid flow of the wastewater stream that is directed into the treatment unit. As provided herein, the systems may predominately passive. The systems may be substantially passively operated, requiring little or no external energy. As will be appreciated, most wastewater treatment systems may require substantial external energy input to operate, such as mechanical, electrical, and/or thermal energy. Such heavy external energy input may be required, for example, to create sufficient pressure for one or more treatment processes (e.g., membrane filtration). The systems of the present disclosure, on the other hand, may be predominantly passive systems. The systems may comprise various units, components that are substantially passively operated and connected with one another in sequence. For example, greater than or equal to about 70%, 75%, 80%, 85%, 90%, 91%, 92%, 93%, 94%, 95%, or more of the systems may be substantially passively operated. The systems may rely on gravity for operation, with minimal external energy input. As such, the systems of the present disclosure may be extremely energy efficient. As compared to a system that requires heavy external energy input, energy required for the systems of the present disclosure for treating the same quantity of wastewater may be reduced by at least 50%, 55%, 60%, 65%, 70%, 75%, 80%, 85%, 90%, or more.

As described above or elsewhere herein, some or all of the units or components of the systems may be modular units or components. The units or components may comprise processing units, fluidic tanks, sensors, pumps, valves, tubes and hoses, or any other components or units that may be required for a wastewater treatment process. The units or components may be associated with and operably coupled each other. The units or components of the systems may be enclosed in a single container. The container may be of various shapes, regular or irregular. The units or components may be assembled in a pre-defined orders or sequences. The orders or sequences may be adjusted on demand or based upon different applications. For example, the same set of units or components may be assembled in different orders for treating a gray water stream and a black water stream. In some cases, depending upon specific applications or compositions of wastewater to be treated, the systems may comprise the same or a different number and/or type of units or components. The systems may comprise one or more (e.g., at least 2, 3, 4, 5, 6, 7, 8, 9, 10 or more) of a certain type of units or components. For example, for a wastewater comprising a high concentration or a large amount of anaerobic species or aerobic species, the systems may comprise more than one anaerobic unit or aerobic unit so as to make sure the concentration of anaerobic species or aerobic species may be reduced to or below a pre-determined level. In some cases, as the treatment progresses, one or more of the units or components may be added, removed or substituted from the system.

The systems may be retrofitted into an existing plumbing system. The systems may be integrated with one or more existing plumbing systems. The systems may be substantially made of plastic materials or any types of materials that have a light weight. In some cases, the systems of the present disclosure have a small footprint. The footprint of the system may be less than or equal to about 10 $m^2$, 9 $m^2$, 8 $m^2$, 7 $m^2$, 6 $m^2$, 5 $m^2$, 4 $m^2$, 3 $m^2$, 2 $m^2$, 1 $m^2$, 0.9 $m^2$, 0.8 $m^2$, 0.7 $m^2$, 0.6 $m^2$, 0.5 $m^2$, 0.4 $m^2$, 0.3 $m^2$, 0.2 $m^2$, 0.1 $m^2$, or less. In some cases, the system of the present disclosure has a weight less than or equal to about 20 kilograms (kg), 19 kg, 18 kg, 17 kg, 16 kg, 15 kg, 14 kg, 13 kg, 12 kg, 11 kg, 10 kg, 9 kg, 8 kg, 7 kg, 6 kg, 5 kg, 4 kg, 3 kg, 2 kg, 1 kg, or less.

Figure 12:
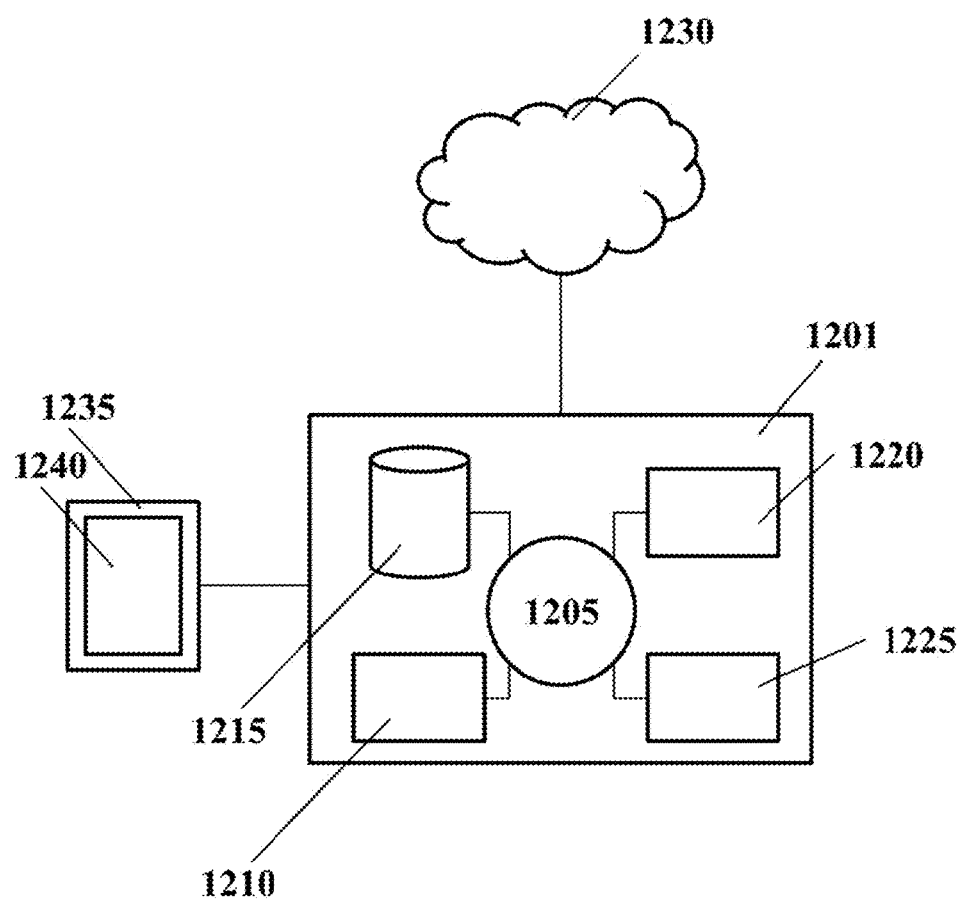
FIG. 12 schematically illustrates a computer system that is programmed or otherwise configured to implement systems and methods of the present disclosure.

The present disclosure also provides computer control systems that are programmed or otherwise configured to implement methods provided herein, such as regulating fluid flow rate of wastewater stream, or adjusting a temperature during treatment processes. FIG. 12 shows a computer system 1201 that includes a central processing unit (CPU, also "processor" and "computer processor" herein) 1205, which can be a single core or multi core processor, or a plurality of processors for parallel processing. The computer system 1201 also includes memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus (solid lines), such as a motherboard. The storage unit 1215 can be a data storage unit (or data repository) for storing data. The computer system 1201 can be operatively coupled to a computer network ("network") 1230 with the aid of the communication interface 1220. The network 1230 can be the Internet, an internet and/or extranet, or an intranet and/or extranet that is in communication with the Internet. The network 1230 in some cases is a telecommunication and/or data network. The network 1230 can include one or more computer servers, which can enable distributed computing, such as cloud computing. The network 1230, in some cases with the aid of the computer system 1201, can implement a peer-to-peer network, which may enable devices coupled to the computer system 1201 to behave as a client or a server.

The CPU 1205 can execute a sequence of machine-readable instructions, which can be embodied in a program or software. The instructions may be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and writeback.

The CPU 1205 can be part of a circuit, such as an integrated circuit. One or more other components of the system 1201 can be included in the circuit. In some cases, the circuit is an application specific integrated circuit (ASIC).

The storage unit 1215 can store files, such as drivers, libraries and saved programs. The storage unit 1215 can store user data, e.g., user preferences and user programs. The computer system 1201 in some cases can include one or more additional data storage units that are external to the computer system 1201, such as located on a remote server that is in communication with the computer system 1201 through an intranet or the Internet. The computer system 1201 can communicate with one or more remote computer systems through the network 1230.

Methods as described herein can be implemented by way of machine (e.g., computer processor) executable code stored on an electronic storage location of the computer system 1201, such as, for example, on the memory 1210 or electronic storage unit 1215. The machine executable or machine readable code can be provided in the form of software. During use, the code can be executed by the processor 1205. In some cases, the code can be retrieved from the storage unit 1215 and stored on the memory 1210 for ready access by the processor 1205. In some situations, the electronic storage unit 1215 can be precluded, and machine-executable instructions are stored on memory 1210.

The code can be pre-compiled and configured for use with a machine having a processor adapted to execute the code, or can be compiled during runtime. The code can be supplied in a programming language that can be selected to enable the code to execute in a pre-compiled or as-compiled fashion.

The computer system 1201 can be programmed or otherwise configured to regulate one or more parameters, such as fluid flow rate of in a given tank or container, temperatures and pressures in one or more processing units.

Aspects of the systems and methods provided herein, such as the computer system 1201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1201 can include or be in communication with an electronic display 1235 that comprises a user interface (UI) 1240 for providing, for example, signals from a chip with time. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1205.

EXAMPLES

FIGS. 1-5 schematically illustrate example methods and systems of the present disclosure. FIG. 1 provides a cross-sectional schematic of an example wastewater treatment tank 100. The tank may be a container, a processing unit or a further processing unit. The tank 100 has an inlet 105, vents 125, acrylic lid 130, partitions 135, irrigation/backwash valves 120/140 and clean outs 145. The arrows indicate a direction of fluid flow.

The tank further comprises a mesh bag 110 suspended therein. Within the mesh bag there is a plastic material 115. The plastic material is a made from a plastic water bottle that is cut in half, twisted and crumpled into the most compact shape, and cut into about 5 cm-length pieces, thereby achieving the smallest volume and creating the largest surface area. A layer of biofilm having a thickness of about 25-52 μm is grown on the surface area of the water bottle. Once the wastewater is passed through the mesh bag and brought into contact with the plastic material and thus the biofilm, the biofilm degrades organic components of the wastewater to produce an effluent stream having a reduced concentration of the organic components.

Figure 2:
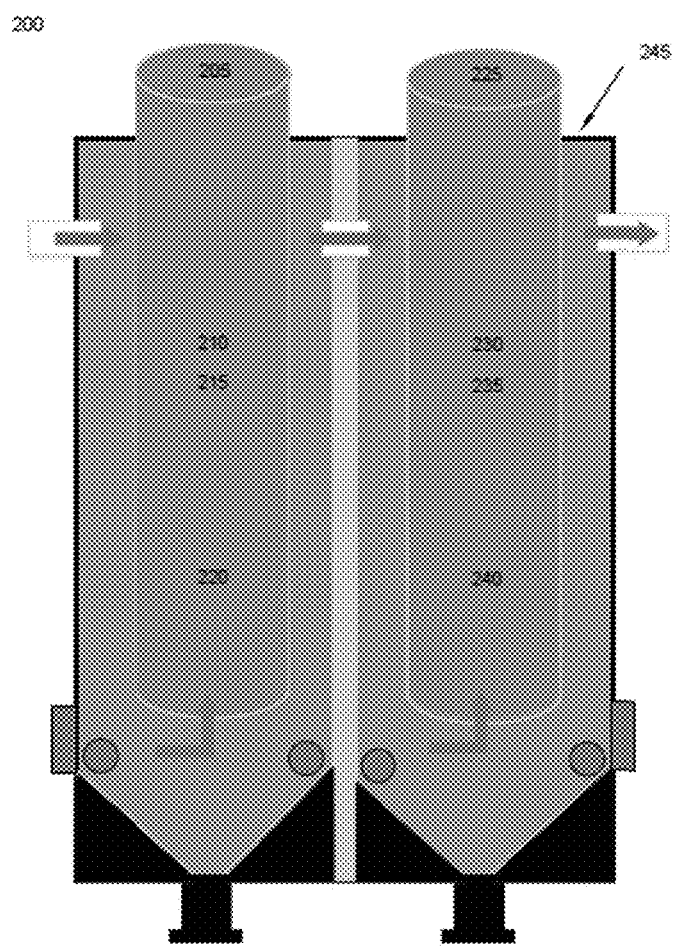
FIG. 2 provides a cross-sectional schematic of an example wastewater treatment tank comprising anaerobic cylinders.

FIG. 2 provides a cross-sectional schematic of an example wastewater treatment tank 200. The tank 200 may be a container, a processing unit or a further processing unit. The arrows indicate a direction of fluid flow. The tank 200 comprises an acrylic lid 245 and two cylinders 210 and 230. Both cylinders are anaerobic cylinders configured to perform anaerobic processes on the wastewater. The anaerobic cylinder 210 comprises a removable cap 205, an open bottom 220 and a plastic material 215. The anaerobic cylinder 230 comprises a removable cap 225, an open bottom 240 and a plastic material 235. The plastic material in both cylinders are made from plastic water bottles that are cut in half, twisted and crumpled into the most compact shape, and cut into about 5 cm-length pieces. The anaerobic cylinders 210 and 230 each comprises a perf base on top of a bottom layer of filter medium. The perf base comprises molded fiberglass grating, about 3 cm deep×3.8 cm square mesh. During the anaerobic process, the removable caps 205 and 225 for both cylinders are sealed.

Figure 3:
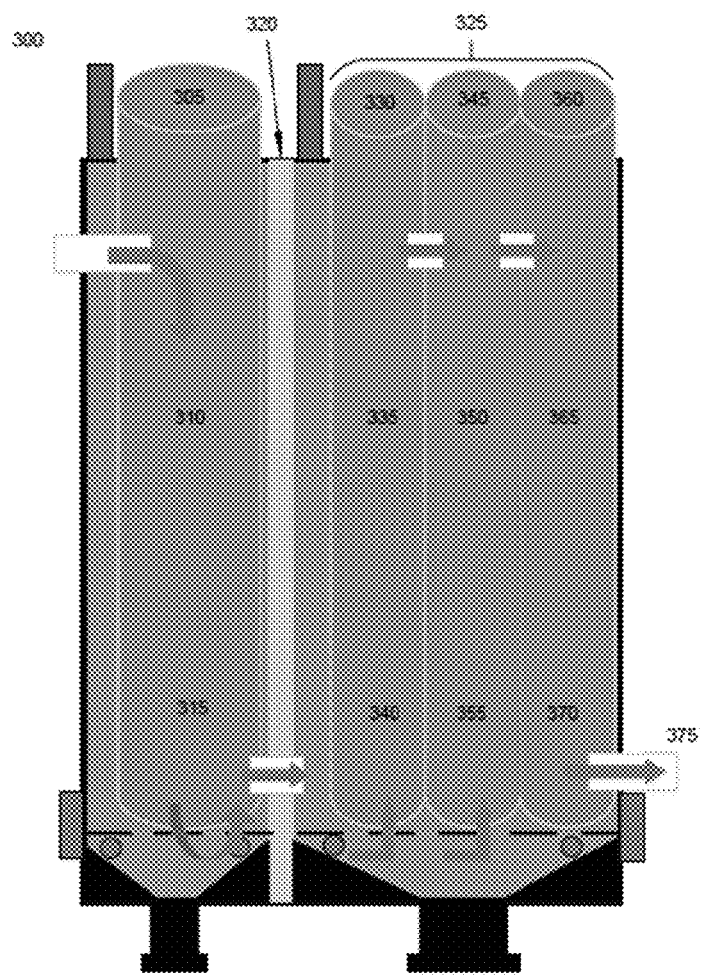
FIG. 3 provides a cross-sectional schematic of an example wastewater treatment tank comprising a trickling cylinder and one or more sand filtration cylinders.

FIG. 3 provides a cross-sectional schematic of an example wastewater treatment tank 300. The tank 300 may be a container, a processing unit or a further processing unit. The arrows indicate a direction of fluid flow. The tank 300 comprises an acrylic lid 320, an outlet 375, a trickling cylinder 310, and optionally one or more of cylinders or pipes 335, 350 and 365 which may or may not be tied together. The trickling cylinder comprises a removable cap 305, an open bottom 315, and a plastic material 310. The plastic material is made from plastic water bottles that are cut in half and twisted and crumpled into the most compact shape. The trickling cylinder also comprises a perf base on top of a bottom layer of filter media. The perf base comprises molded fiberglass grating having a thickness about 2.5 cm with a mesh size about 3.8 cm.

The cylinder 335 may be an upflow roughing filtration (URF) cylinder that comprises a removable cap 330, an open bottom 340, and a first type of filtration media. The cylinder 350 is also an URF cylinder. The URF cylinder 345 comprises a removable cap 345, an open bottom 355, and a second type of filtration media. The URF cylinders 335 and 350 comprise a bottom layer of gravel and cobbles with a height between 10 cm and 15 cm. On top of the gravel/cobbels layer is a perf base which comprises molded fiberglass grating having a thickness about 2.5 cm with a mesh size about 3.8 cm. Above the perf base there is a layer of gravel having a height between about 5 cm and 10 cm.

The cylinder 365 may be a biosand cylinder that comprises a removable cap, a closed bottom 370 and one or more filter media. The filter media in the biosand cylinder 365 includes a bottom layer of pea gravel with a height between about 5 and 15 centimeters (cm), a coarse sand layer on top of the pea gravel layer with a height between about 5 cm and 15 cm, a fine sand layer on top of the coarse sand layer with a height between about 20 cm and 60 cm, and a 50/50 fine sand/iron filings layer halfway through the full height of the sand media about 3 cm and 8 cm, falling within the fine sand layer. A metal diffuser plate is optionally placed over biosand media (i.e., on top of the fine sand layer) so as to prevent disruption of the materials.

Figure 4:
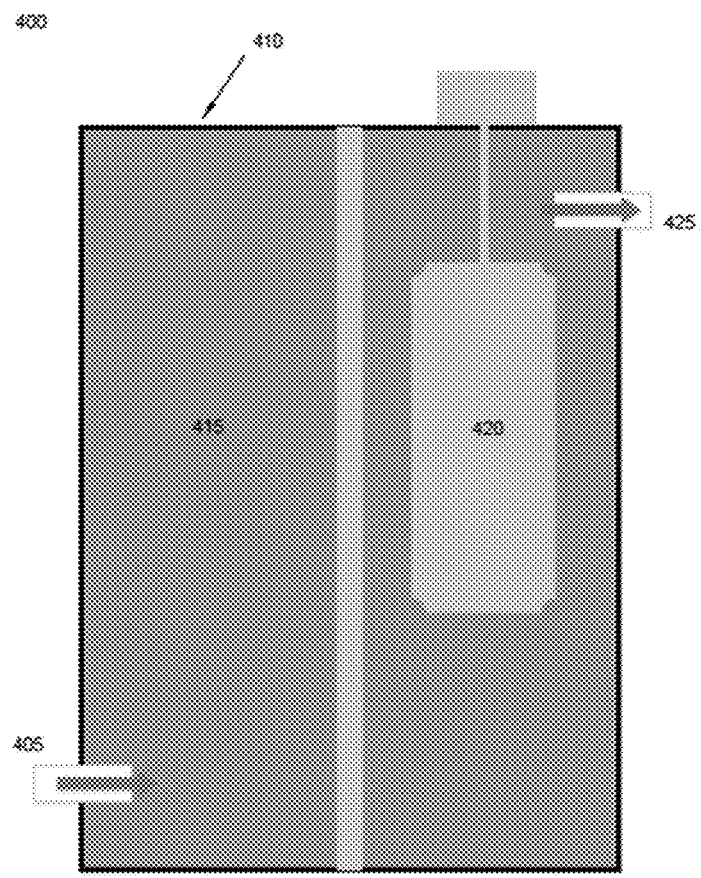
FIG. 4 provides a cross-sectional schematic of an example wastewater treatment tank comprising charcoal and/or ozonator.

FIG. 4 provides a cross-sectional schematic of an example wastewater treatment tank 400. The tank 400 may be a container, a processing unit or a further processing unit. The arrows indicate a direction of fluid flow. The tank 400 comprises an inlet 405, an outlet 425, an acrylic lid 410, and two compartments. The left compartment comprises activated charcoal 415. The right compartment comprises an ozonator or ozone diffuser/bubbler 420 that adds an amount of ozone and results in a sanitizing and oxidizing effect. In some cases, at least a portion of ozone may be recycled. The ozone may be recycled from the ozonation chamber to the charcoal chamber. The ozone recycling may enhance removal of organics, chemical, heavy metals or other unwanted species or constituents from the water stream. The ozone recycling may also improve the effectiveness of the activated charcoal.

Figure 5:
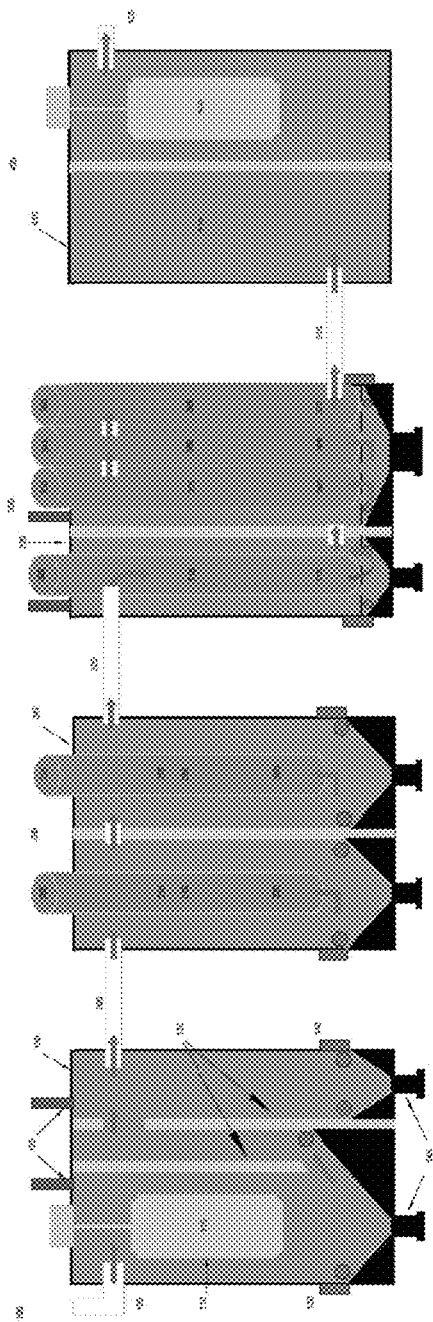
FIG. 5 provides a cross-sectional schematic of an example system comprising four wastewater treatment tank assembled and in fluidic connections with one another.

FIG. 5 provides a schematic of an example system with assembled wastewater treatment tanks 100-400. The arrows indicate a direction of the fluid flow. As shown in FIG. 5, a wastewater stream is directed into the system from the inlet 105 and subsequently passed through the tanks 200, 300 and 400 via fluid connections 500, 505 and 510 respectively. The wastewater stream is subjected to multiple treatments or processing steps in the treatment tanks 100-400 to produce a product stream 425 for use or optionally subjected to further processing.

Figure 6:
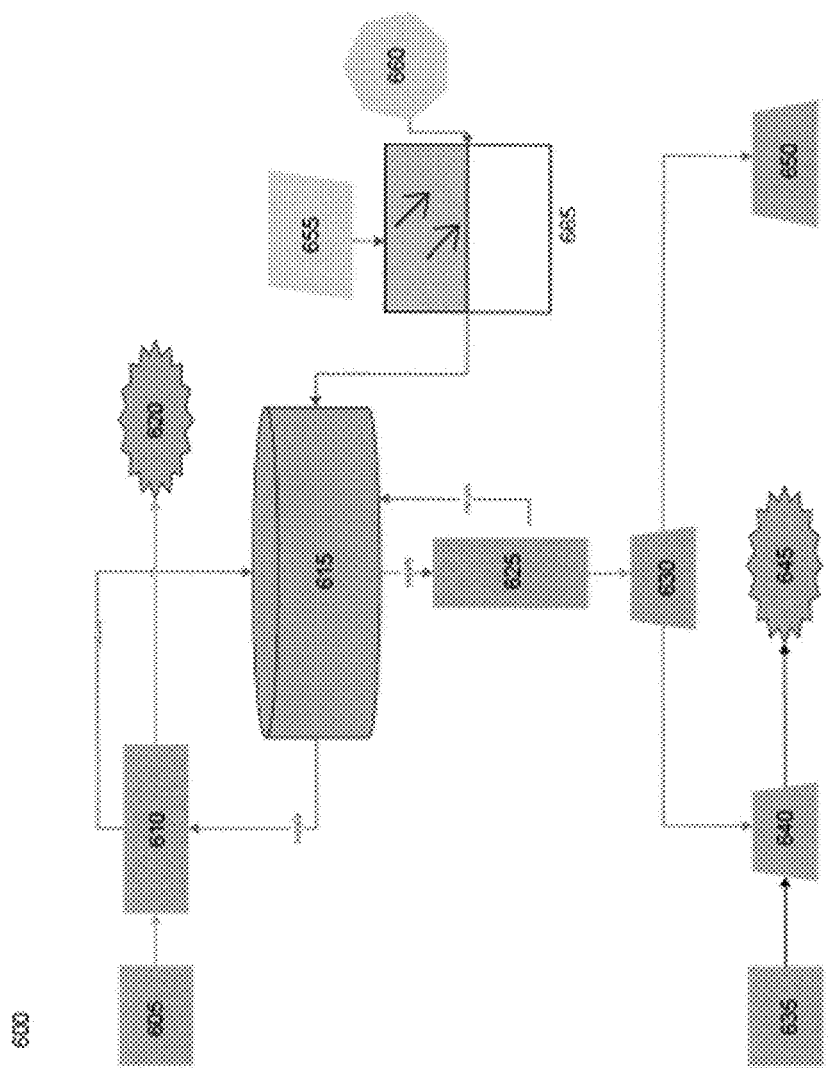
FIG. 6 provides a schematic of an example system comprising a power supply unit.
Figure 7:
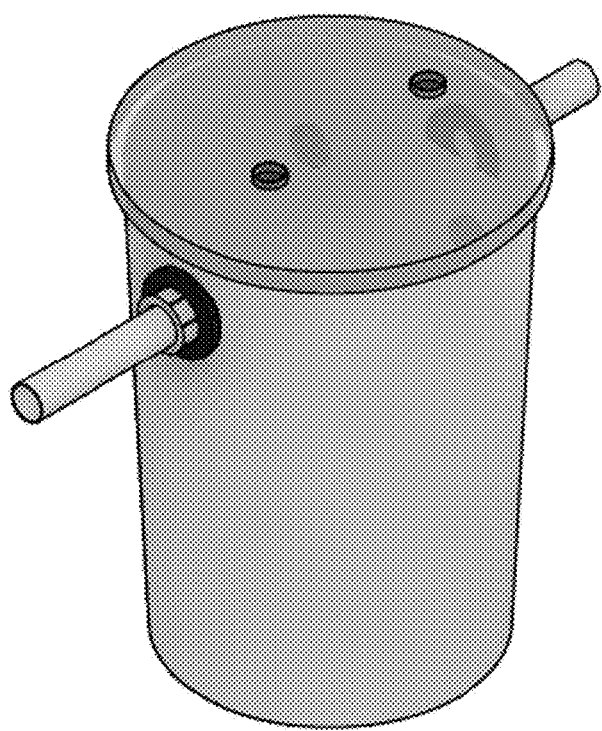
FIG. 7 shows a three-dimensional (3D) perspective view of the example wastewater treatment tank of FIG. 1.
Figure 8:
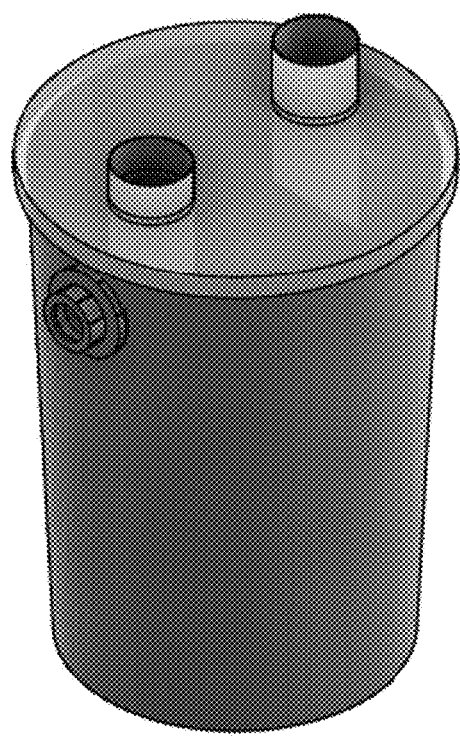
FIG. 8 shows a 3D perspective view of the example wastewater treatment tank of FIG. 2.
Figure 9:
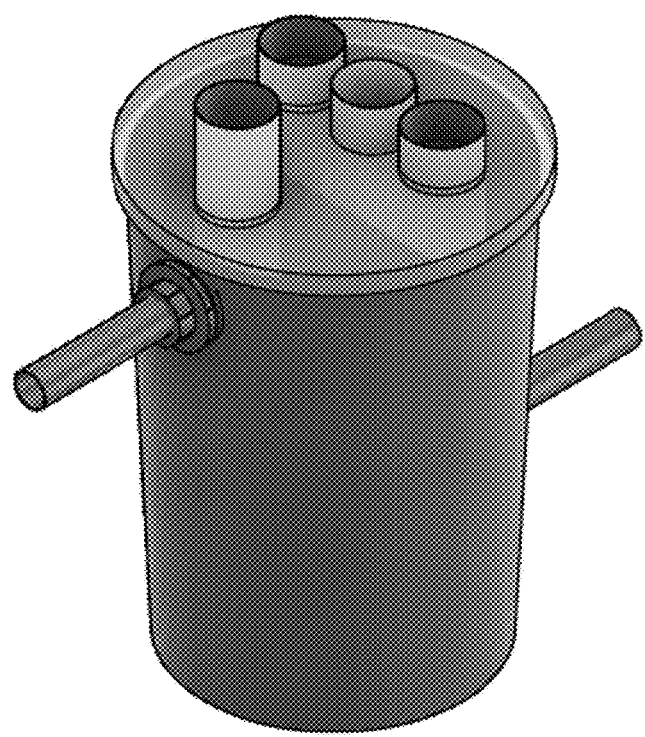
FIG. 9 shows a 3D perspective view of the example wastewater treatment tank of FIG. 3.
Figure 10:
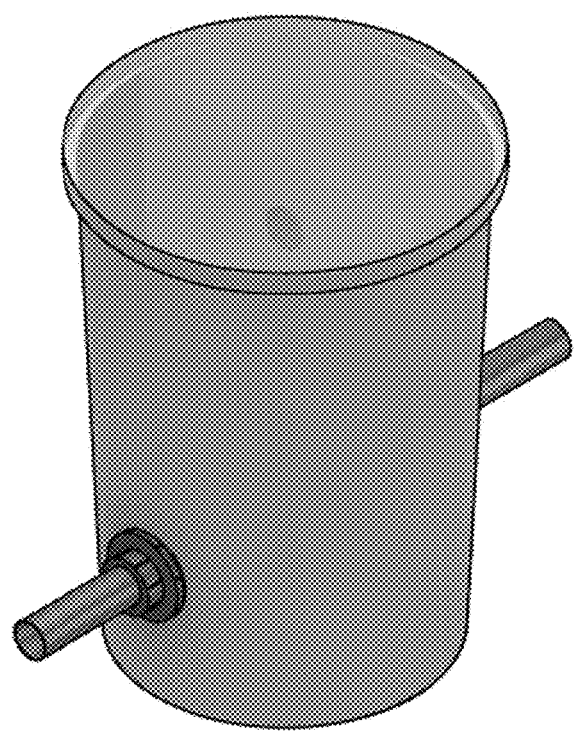
FIG. 10 shows a 3D perspective view of the example wastewater treatment tank of FIG. 4.

An example system comprising a power supply unit is illustrated in FIG. 6. As shown in the figure, a stream of treated wastewater 605 is directed to a heat transfer unit 610 for sterilization or disinfection to produce a stream of potable water 620. The thermal energy required for the sterilization or disinfection process is supplied by a glycol holding tank 615. The tank 615 has a temperature greater than or equal to about 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., 120° C., 140° C., 160° C., 180° C., 200° C., 220° C., 240° C., 260° C., 280° C. or more. The excess heat or thermal energy from the sterilization or disinfection process is returned to the tank 615.

Additionally or alternatively, the tank 615 also supplies the thermal energy via a second heat transfer unit 625 to a generator 630. The generator 630 converted at least a portion of the thermal energy into an electrical energy and supplies the electrical energy to an incinerator 640 and other electrical loads 650. The incinerator 640 is configured to convert urine and biosolids 635 into sterilized organic fertilizer 645.

The system of FIG. 6 also comprises a solar subsystem 665 and optionally a grid management unit 660 which is operatively coupled with the solar subsystem 665. The solar subsystem 665 concentrates the solar energy 655 and transfers at least of the solar energy to the tank 615.

FIGS. 7-10 show 3D perspective view of example wastewater tanks of FIGS. 1-4 respectively. The tanks have the same shape, size and volume. Each tank has a height about 1 meter (m) and a top diameter about 0.6 m.

Figure 11:
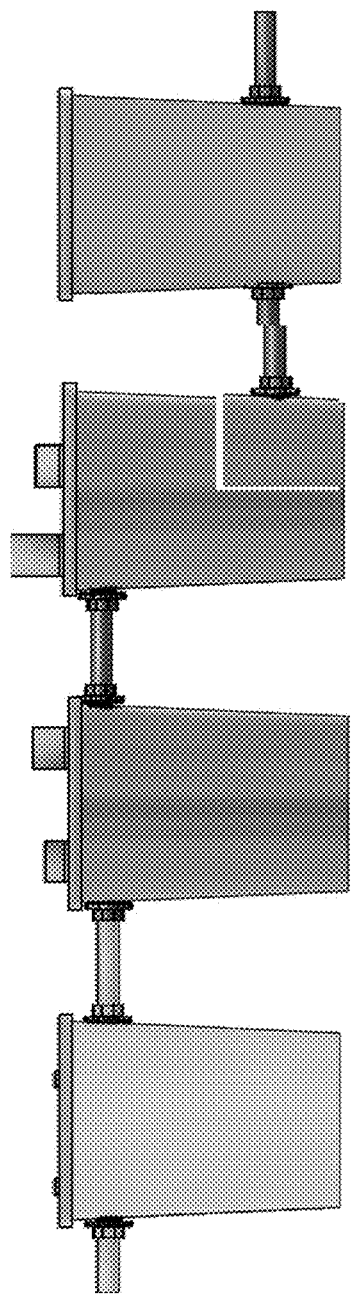
FIG. 11 shows a side view of the example system of FIG. 5.

An example system of the present disclosure with the water tanks assembled together is shown in FIG. 11. As shown in the figure, the water tanks are in fluidic communication with one another and are connected in series. A wastewater stream is directed into the system and subjected to various processing steps in the tanks to generate a product stream. The product stream comprises a potable water stream or a stream of treated water having a reduced concentration of one or more contaminants which were originally included in the wastewater stream.

Figure 13:
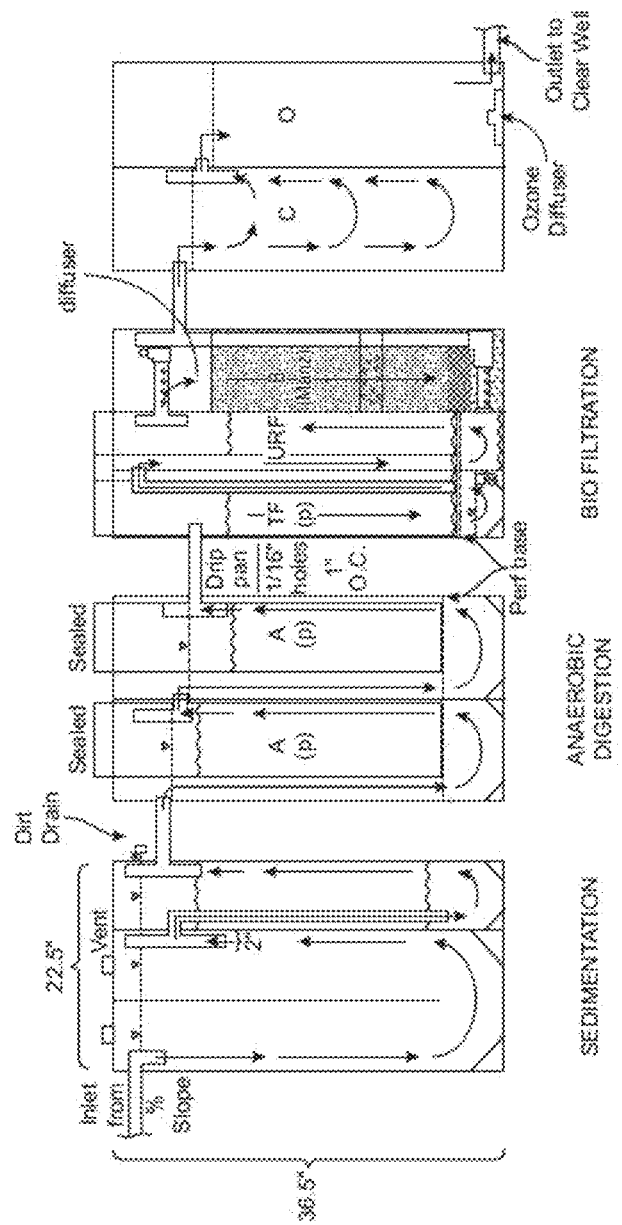
FIG. 13 provides a cross-sectional schematic of an example system comprising four wastewater treatment tank assembled and in fluidic connections with one another.

FIG. 13 provides a schematic of an example system of the present disclosure. As shown in the figure, the system comprises four treatment tanks assembled together and in fluidic connection with each other. The tanks are configured to perform sedimentation, anaerobic digestion, biofiltration, and purification processes respectively. The sedimentation tank comprises two compartments and is configured to separate at least a portion of solids from the wastewater stream. The anaerobic digestion tank comprises two anaerobic cylinders configured to perform anaerobic processes on the wastewater. The biofiltration tank comprises a trickling cylinder, an upflow roughing cylinder and a biosand cylinder. The purification tank comprises two compartments. The left compartment comprises activated charcoal and the right compartment comprises an ozonator that adds an amount of ozone and results in a sanitizing and oxidizing effect.

Figure 14:
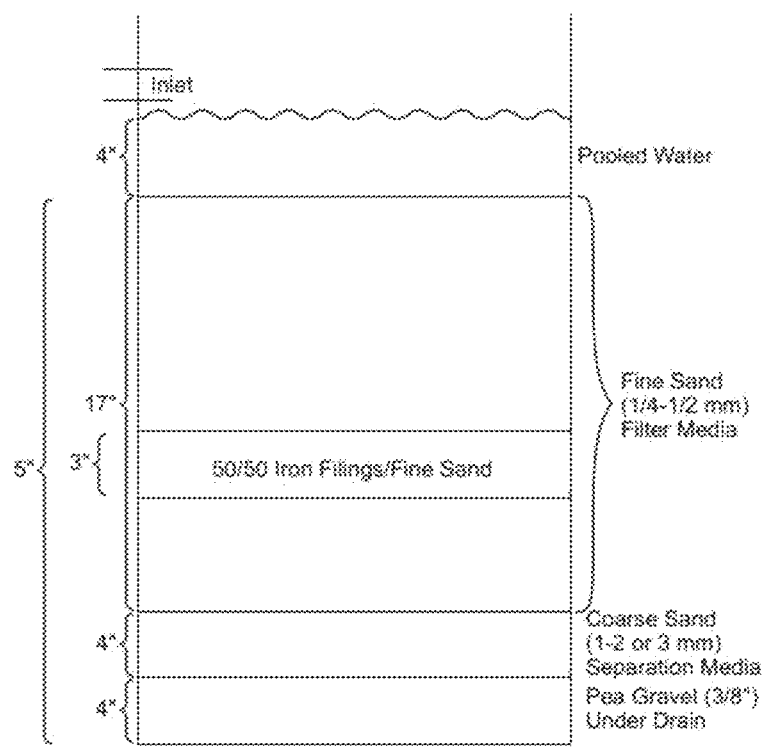
FIG. 14 provides a cross-sectional schematic of an example biosand cylinder for wastewater treatment.

Schematic of an example biosand cylinder is shown in FIG. 14. As shown in the figure, the biosand cylinder comprises filter media including a bottom layer of pea gravel with a height about 10 cm, a coarse sand layer on top of the pea gravel layer with a height about 10 cm, a fine sand layer on top of the coarse sand layer with a height 40 cm, and a 50/50 fine sand/iron filings layer halfway through the full height of the sand media about 7 cm, falling within the fine sand layer. A metal diffuser plate is optionally placed over biosand media (i.e., on top of the fine sand layer) so as to prevent disruption of the materials.

Figure 15:
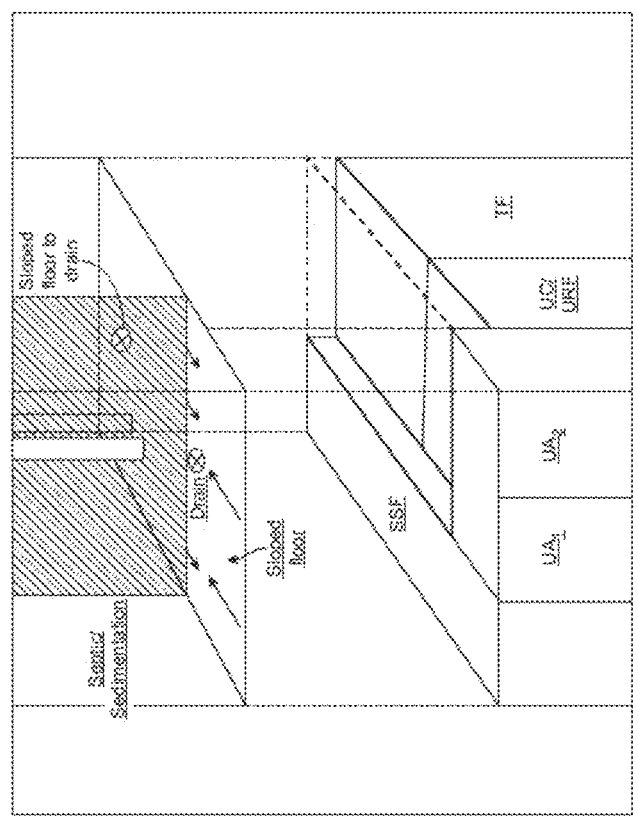
FIG. 15 is a schematic perspective view of a sample system comprising a septic tank and one or more processing units.

FIGS. 15-17 show an example system of the present disclosure. The system may be a modular system which comprising modular units. As shown in FIG. 15, the system may be box-shaped and all modular units of the system may be fitted and enclosed in a single container. The system may comprise a septic/sedimentation tank which may receive and retain wastewater. The septic tank may comprise a baffle wall which may divide the septic tank into two chambers. Solids may be retained in one chamber, and liquids may pass through the baffle into the other chamber for further processing. The septic tank may also comprise a sloped floor which may facilitate removal of the solids or liquids from the septic tank. The system may further comprise a plurality of processing units. The processing units may be situated at a lower position of the container. The processing units may be in fluidic communication with one another and the septic tank. As illustrated in FIGS. 15-17, the processing units may comprise a drip pan, a slow sand filtration (SSF) unit, a first upflow anaerobic unit (UA1), a second upflow anaerobic unit (UA2), an upflow roughing filtration (URF) unit, and a trickling filtration (TF) unit. As will be appreciated, each of the processing units may be removed, duplicated or substituted. In some cases, additional processing units may be comprised in the system, for example, aerobic units, purification units, sterilization units, disinfection units, heating units or combinations thereof. A wastewater stream generated in the septic tank may be directed through the processing units and subjected to one or more processing steps to produce a product stream. The product stream may be directed out of the system via an outlet for use. For example, a wastewater stream produced by the septic tank may be directed from an outlet of the septic tank to UA1. The wastewater stream may then be directed to flow through UA1, UA2, URF, TF and SSF sequentially to generate a product stream for point of use (POU). The product stream may have a water quality that is suitable for drinking, cooking, and/or bathing.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for processing wastewater comprising:
   a container configured to (a) receive wastewater comprising black water; and (b) produce a wastewater stream from said wastewater;
   a processing unit in fluidic communication with said container, configured to (a) receive said wastewater stream from said container; and (b) perform a separation process to separate a solid phase from a liquid phase of said wastewater stream, wherein said processing unit comprises a mesh bag comprising a non-porous plastic material;
   one or more processing units configured to perform one or more anaerobic digestion processes to reduce a concentration of anaerobic species from said wastewater stream, and/or (ii) one or more aerobic digestion processes to reduce a concentration of aerobic species from said wastewater stream; and
   one or more disinfection units configured to perform one or more disinfection processes to reduce a concentration of bacteria and/or viruses from said wastewater stream, thereby producing a product stream having drinking-water quality,
   wherein said separation process is upstream of any one of said one or more anaerobic digestion processes and said one or more aerobic digestion processes and comprises sedimentation, flotation, and/or precipitation; wherein said one or more anaerobic digestion processes and said one or more aerobic digestion processes are upstream of any one of said one or more disinfection processes.

2. The system of claim 1, wherein said product stream has a microbes concentration that is less than 1 parts per million.

3. The system of claim 1, further comprising a sensor that detects a property of said product stream, wherein said property includes a concentration of one or more microbes in said product stream.

4. The system of claim 1, further comprising an additional processing unit downstream of and in fluidic communication with said container.

5. The system of claim 4, wherein said additional processing unit is configured to receive said wastewater stream from said container and perform an additional separation process on said wastewater stream prior to directing said wastewater stream into said processing unit.

6. The system of claim 5, further comprising a waste tank configured to receive solid components separated from said wastewater stream in said additional separation process.

7. The system of claim 4, wherein said additional processing unit is configured to permit said wastewater stream to pass through a non-porous plastic material to produce an effluent stream having a reduced concentration of organic components relative to said wastewater stream, wherein said non-porous material is contained in a mesh bag and comprises a biofilm on a surface of said non-porous plastic material, and wherein said biofilm has a thickness less than about 250 micron ($\mu$m).

8. The system of claim 1, further comprising a second additional separation process, wherein said second additional separation process comprises sand filtration, and optionally has a filtration rate that is greater than or equal to about 0.5 m/h.

9. The system of claim 1, further comprising a second additional separation process, wherein said second additional separation process comprises roughing filtration, wherein said roughing filtration comprises one or more filter media, wherein one or more filter media optionally comprise sand, gravel and/or fiber.

10. The system of claim 1, further comprising a computer processor operatively coupled to said container, said processing unit, said one or more processing units, and/or said one or more disinfection units.

11. The system of claim 10, further comprising a computer control unit programmed to control fluid flow rate of said wastewater stream in said container, and/or from said container to said processing unit.

12. The system of claim 11, wherein said computer control unit is programmed to:
   a. direct fluid flow among said container and said processing unit; and/or
   b. monitor operations of said container, said processing unit, said one or more processing units, and/or said one or more disinfection units;
   wherein said processing unit, said one or more processing units, and/or said one or more disinfection units are optionally connected to one another in series.

13. The system of claim 1, further comprising one or more purification units configured to perform a purification process on said product stream to decrease a concentration of one or more contaminants in said product stream, wherein said purification process optionally comprises charcoal filtration.

14. The system of claim 1, further comprising one or more sterilization units configured to perform a sterilization process on said product stream to decrease a concentration of one or more contaminants in said product stream, wherein said sterilization process further comprises an energy supply unit configured to provide thermal energy for said sterilization process, wherein said energy supply unit comprises one or more optical units configured to concentrate solar thermal energy.

15. The system of claim 14, wherein said energy supply unit is further configured to convert at least a portion of said solar thermal energy to electrical energy, at least a portion of which is used for operating said system.

16. The system of claim 1, wherein said system has a footprint less than about 1 m$^2$, or wherein the system has a weight less than about 1 kg.

17. The system of claim 6, further comprising an incineration unit configured to receive said solid components from said waste tank and to perform an incineration process on said solid components.

18. The system of claim 6, further comprising a grinder configured to receive said solid components from said waste tank and to reduce a volume of said solid components.

19. A method for processing wastewater comprising:
directing a wastewater stream to a processing unit;
using said processing unit to perform on said wastewater stream a separation process to separate a solid phase from a liquid phase of said wastewater stream, wherein said processing unit comprises a mesh bag comprising a non-porous plastic material;
using one or more processing units to perform (i) one or more anaerobic digestion processes to reduce a concentration of anaerobic species from said wastewater stream, and/or (ii) one or more aerobic digestion processes to reduce a concentration of aerobic species from said wastewater stream; and
using one or more disinfection units to perform one or more disinfection processes to reduce a concentration of bacteria and/or viruses from said wastewater stream, thereby producing a product stream having drinking-water quality,
wherein said separation process is upstream of any one of said one or more anaerobic digestion processes and said one or more aerobic digestion processes; wherein said separation process comprises sedimentation, flotation, and/or precipitation; wherein said one or more anaerobic digestion processes and said one or more aerobic digestion processes are upstream of any one of said one or more disinfection processes.

\* \* \* \* \*